US012284746B2

(12) United States Patent
Park et al.

(10) Patent No.: US 12,284,746 B2
(45) Date of Patent: Apr. 22, 2025

(54) THERMAL PLASMA PROCESSING APPARATUS

(71) Applicant: LG ELECTRONICS INC., Seoul (KR)

(72) Inventors: Hyunwoo Park, Seoul (KR); Wooil Kim, Seoul (KR); Gyegwang Lee, Seoul (KR); Imjun Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 947 days.

(21) Appl. No.: 17/424,143

(22) PCT Filed: Jan. 20, 2020

(86) PCT No.: PCT/KR2020/000924
§ 371 (c)(1),
(2) Date: Jul. 19, 2021

(87) PCT Pub. No.: WO2020/153685
PCT Pub. Date: Jul. 30, 2020

(65) Prior Publication Data

US 2022/0151053 A1 May 12, 2022

(30) Foreign Application Priority Data

Jan. 21, 2019 (KR) ........................ 10-2019-0007398

(51) Int. Cl.
*H05H 1/34* (2006.01)
*H05H 1/28* (2006.01)
*H05H 1/42* (2006.01)

(52) U.S. Cl.
CPC ............ *H05H 1/3405* (2013.01); *H05H 1/28* (2013.01); *H05H 1/34* (2013.01); *H05H 1/3478* (2021.05); *H05H 1/42* (2013.01)

(58) Field of Classification Search
CPC ...... H05H 1/3405; H05H 1/3478; H05H 1/28; H05H 1/34; H05H 1/42
(Continued)

(56) References Cited

U.S. PATENT DOCUMENTS

2013/0236652 A1* 9/2013 Belashchenko .......... H05H 1/34 427/446
2018/0247797 A1* 8/2018 Gorokhovsky ..... C23C 14/0605
(Continued)

FOREIGN PATENT DOCUMENTS

CN 101660144 3/2010
CN 101699928 4/2010
(Continued)

OTHER PUBLICATIONS

The State Intellectual Property Office of the People's Republic of China Application Serial No. 202080010102.5, Office Action dated Aug. 21, 2023, 10 pages.
(Continued)

*Primary Examiner* — Eric S Stapleton
*Assistant Examiner* — Yeong Juen Thong
(74) *Attorney, Agent, or Firm* — LEE, HONG, DEGERMAN, KANG & WAIMEY

(57) ABSTRACT

The present disclosure relates to a thermal plasma processing apparatus capable of efficiently using thermal plasma and securing a reaction time for the thermal decomposition of the processing gas. A Thermal plasma processing apparatus according to an embodiment of the present disclosure includes a torch part in which an arc is generated between a negative electrode and a positive electrode, and in which a processing gas to be thermally decomposed by the arc is injected between the negative electrode and the positive electrode, a power supply part configured to be connected to the negative electrode and the positive electrode and to
(Continued)

apply a high voltage between the negative electrode and the positive electrode, and a reaction part configured to communicate with the torch part and to generate turbulence in the processing gas passing through the torch part.

17 Claims, 17 Drawing Sheets

(58) Field of Classification Search
USPC ........................................ 219/121.47, 121.52
See application file for complete search history.

(56) References Cited

U.S. PATENT DOCUMENTS

| | | | | |
|---|---|---|---|---|
| 2018/0254166 | A1* | 9/2018 | Kawaguchi | H01J 37/08 |
| 2020/0157675 | A1* | 5/2020 | Wright | C23C 14/3428 |

FOREIGN PATENT DOCUMENTS

| | | |
|---|---|---|
| CN | 203504871 | 3/2014 |
| JP | 2006292333 | 10/2006 |
| KR | 1020040021285 | 3/2004 |
| KR | 1020040097585 | 11/2004 |
| KR | 1020090014687 | 2/2009 |
| KR | 100967016 | 3/2009 |
| KR | 100910875 | 8/2009 |
| KR | 101111207 | 2/2012 |
| KR | 101373196 | 3/2014 |
| KR | 101573844 | 5/2015 |
| KR | 1020180066576 | 6/2018 |

OTHER PUBLICATIONS

PCT International Application No. PCT/KR2020/000924, International Search Report dated May 29, 2020, 3 pages.

* cited by examiner

【Figure 1】
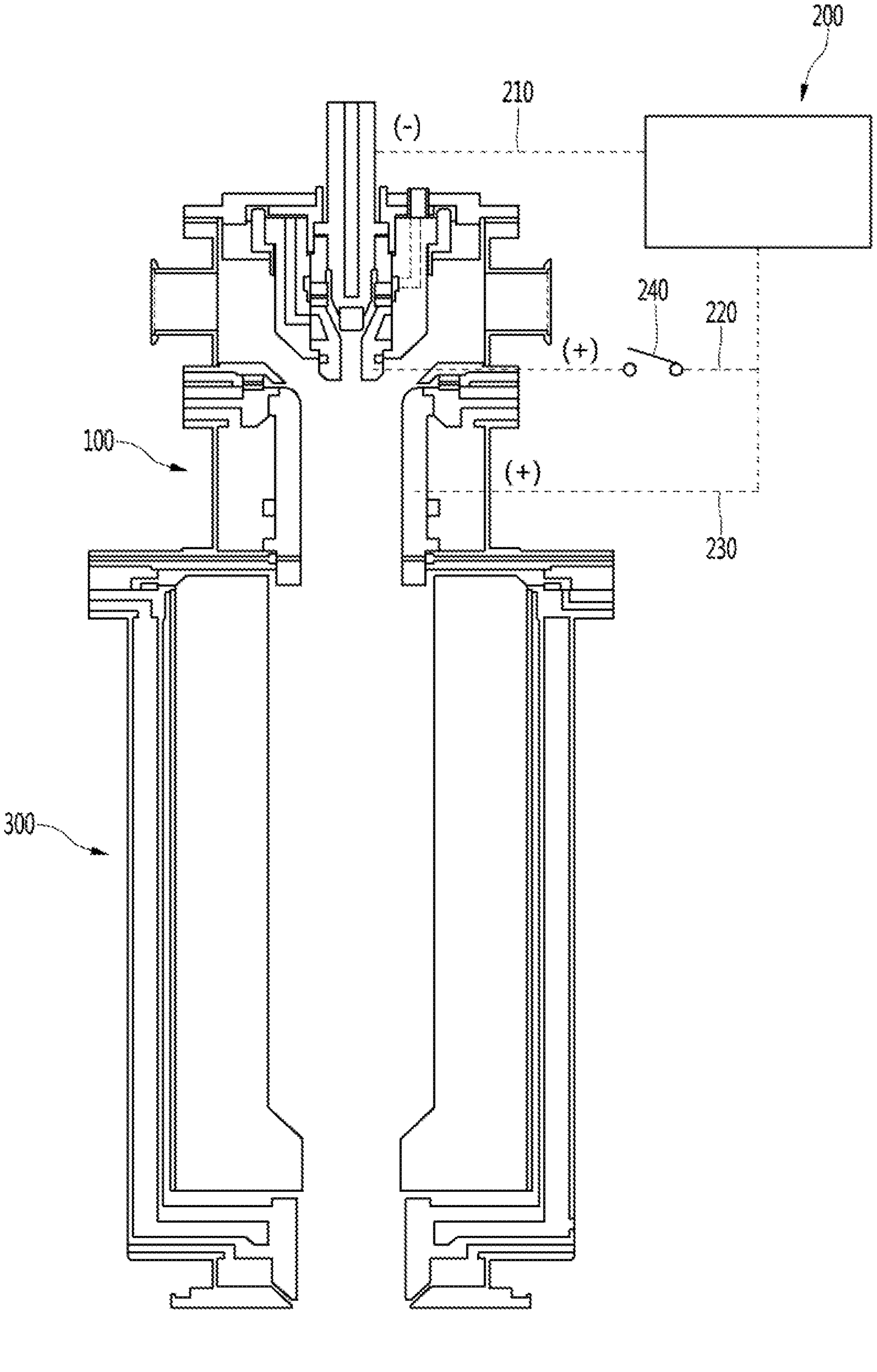

【Figure 2】
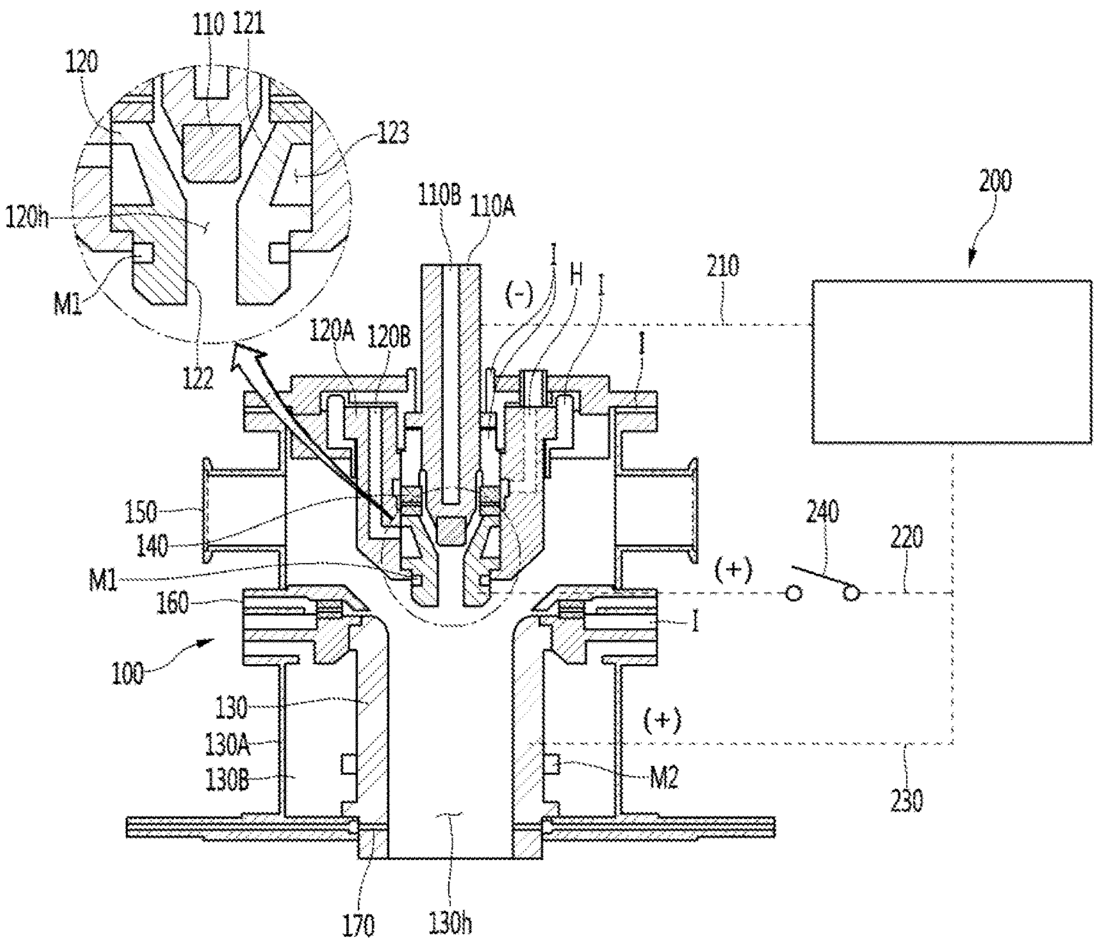
【Figure 3a】
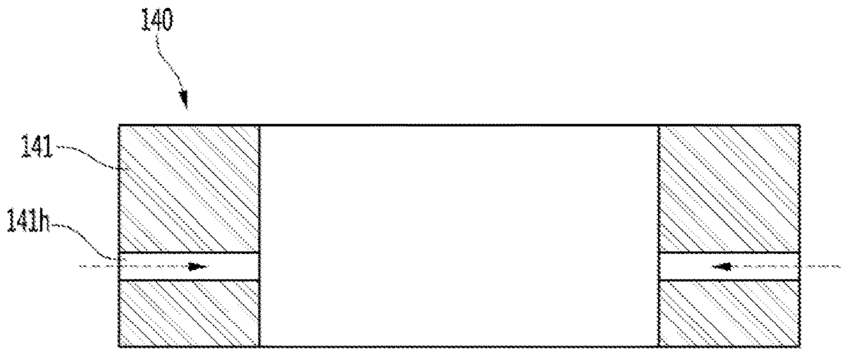

【Figure 3b】
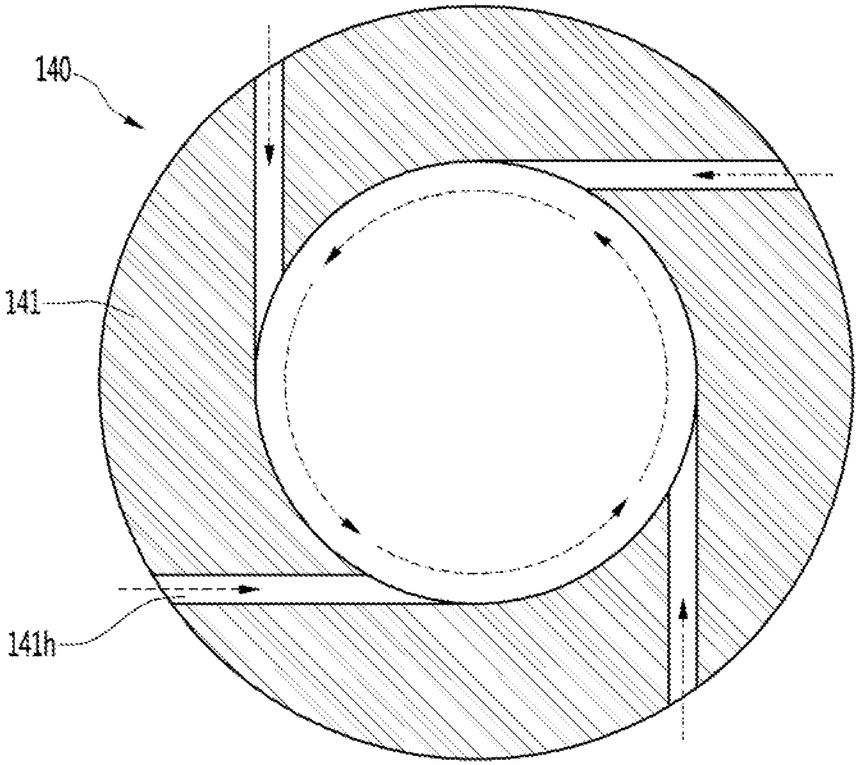
【Figure 4a】
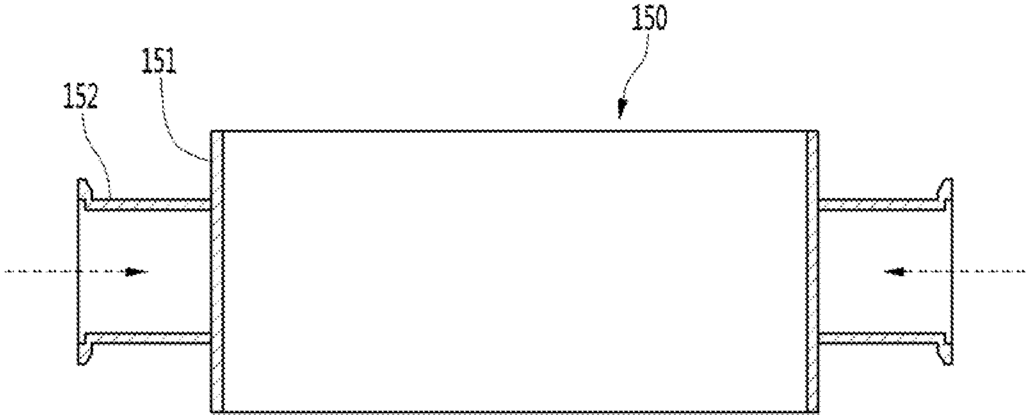

【Figure 4b】
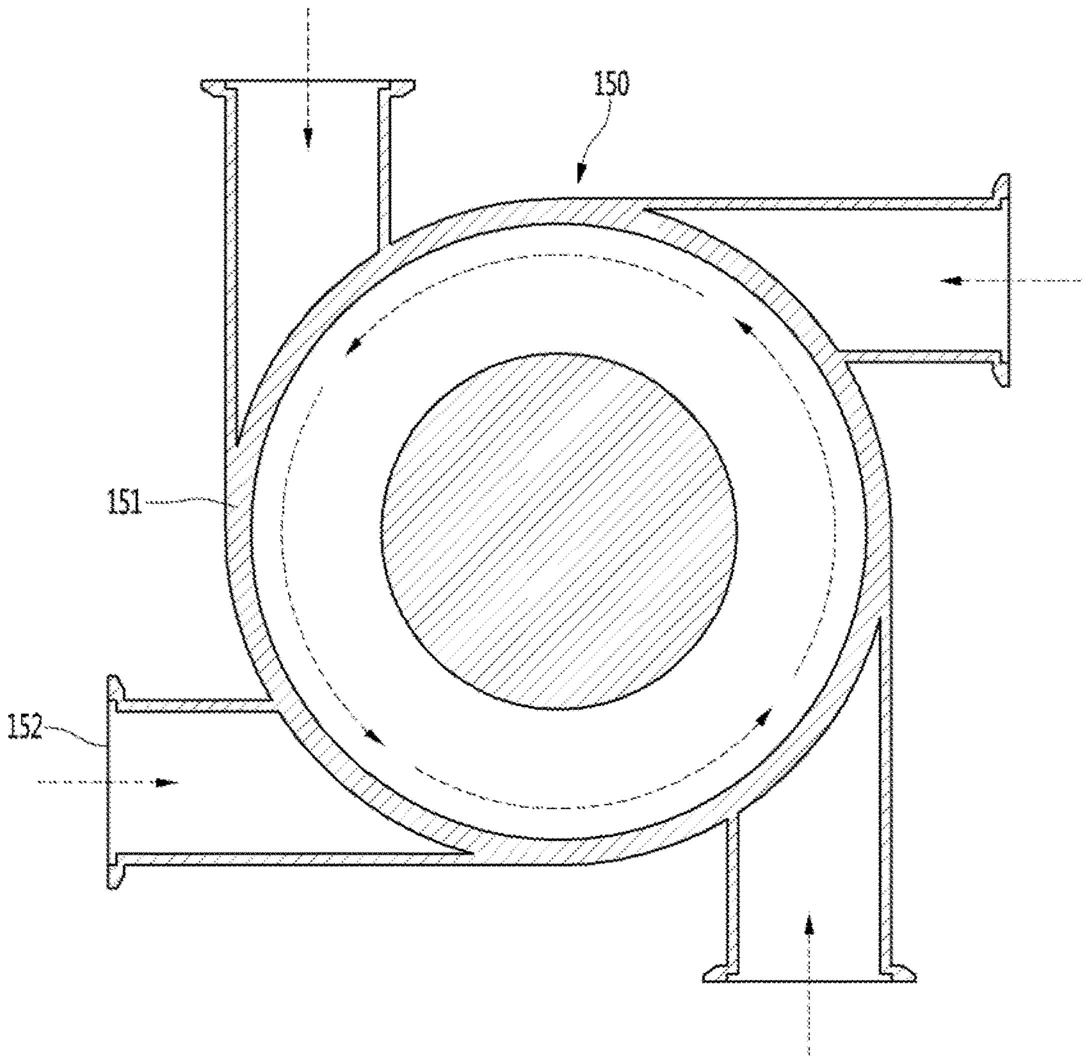
【Figure 5a】
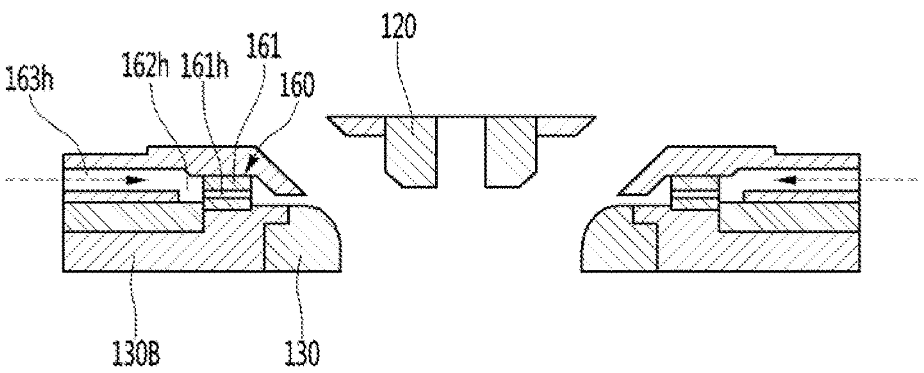

【Figure 5b】
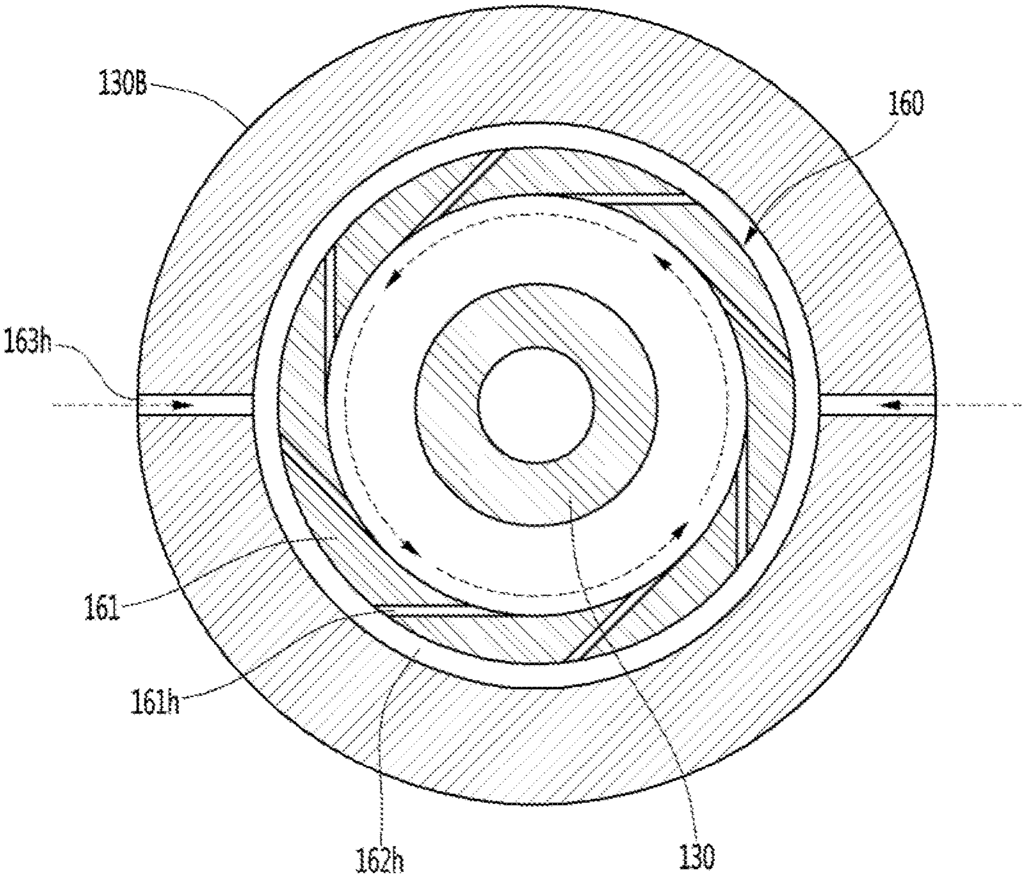
【Figure 6a】
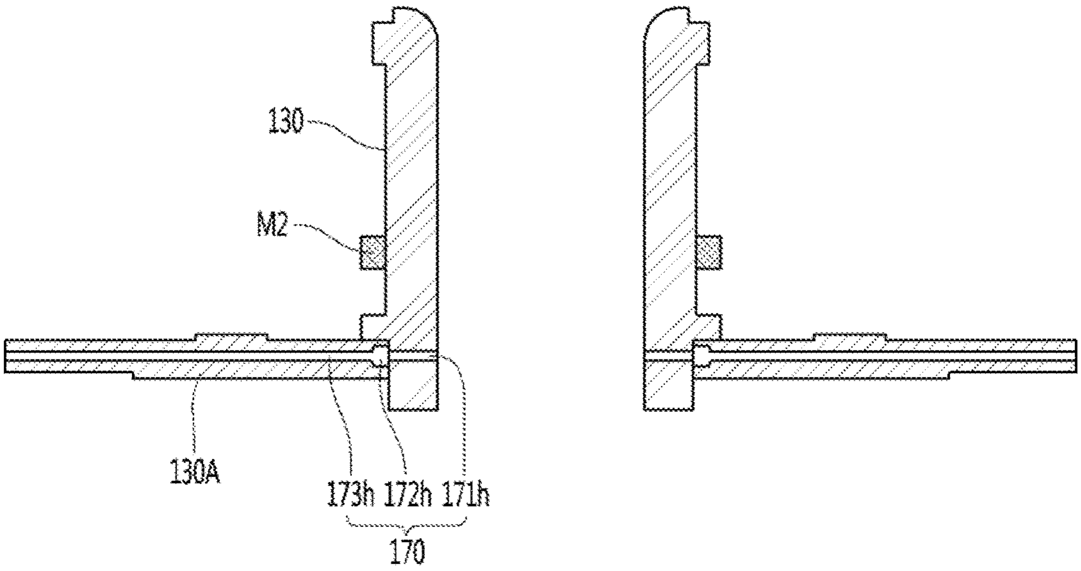

【Figure 6b】
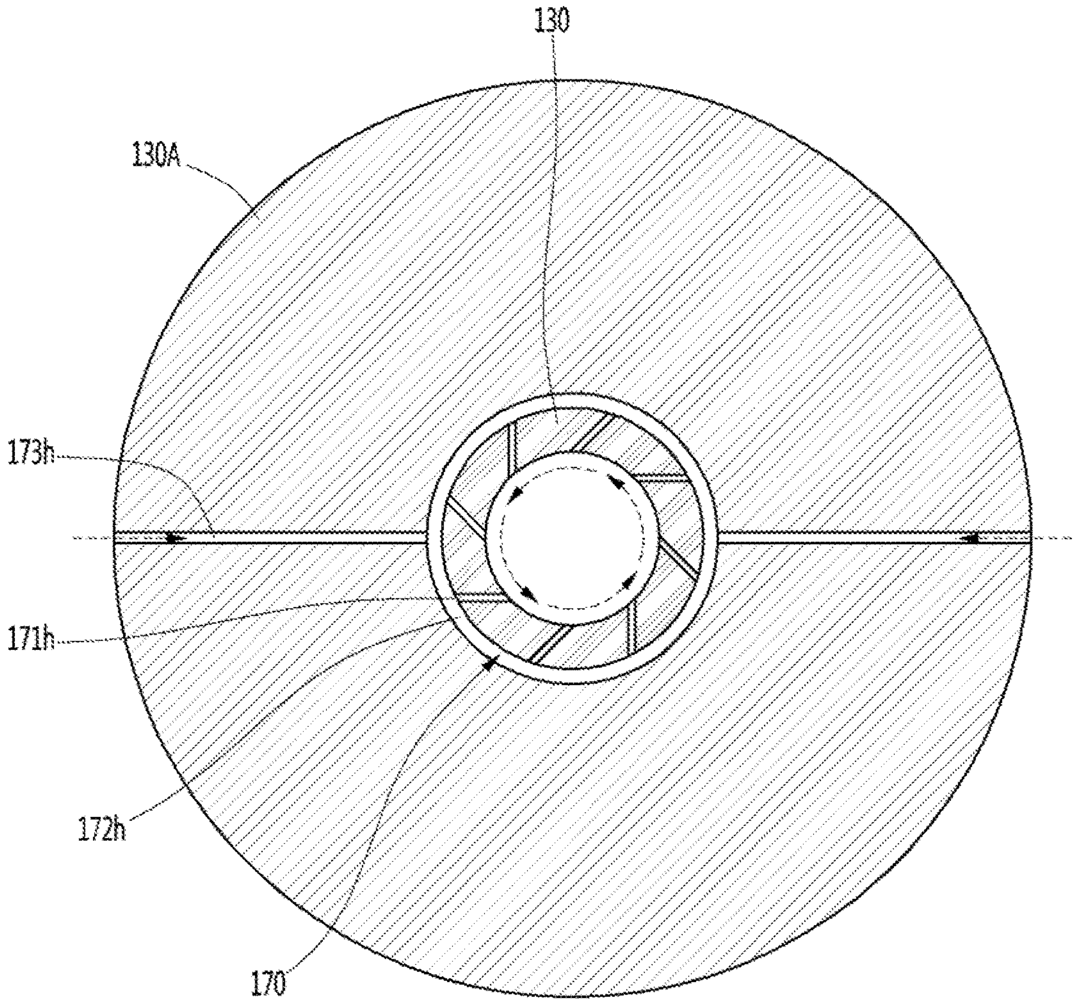

【Figure 7a】
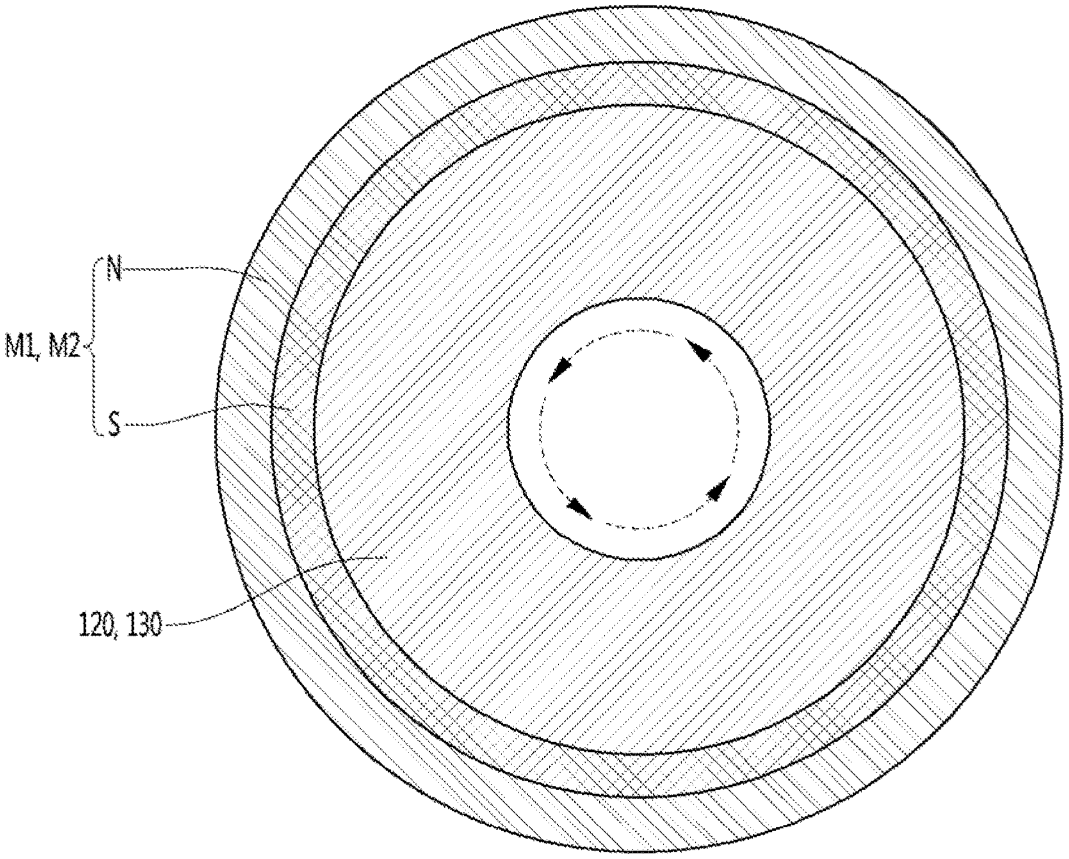

【Figure 7b】
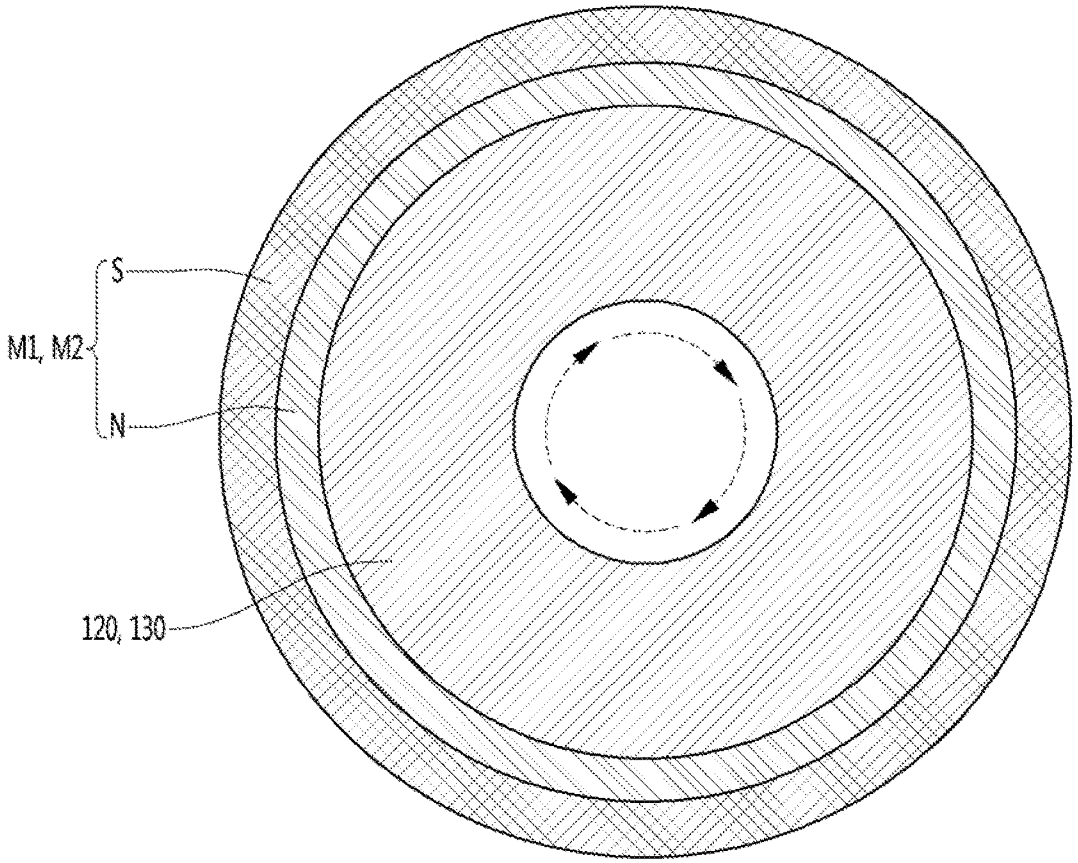

【Figure 8】
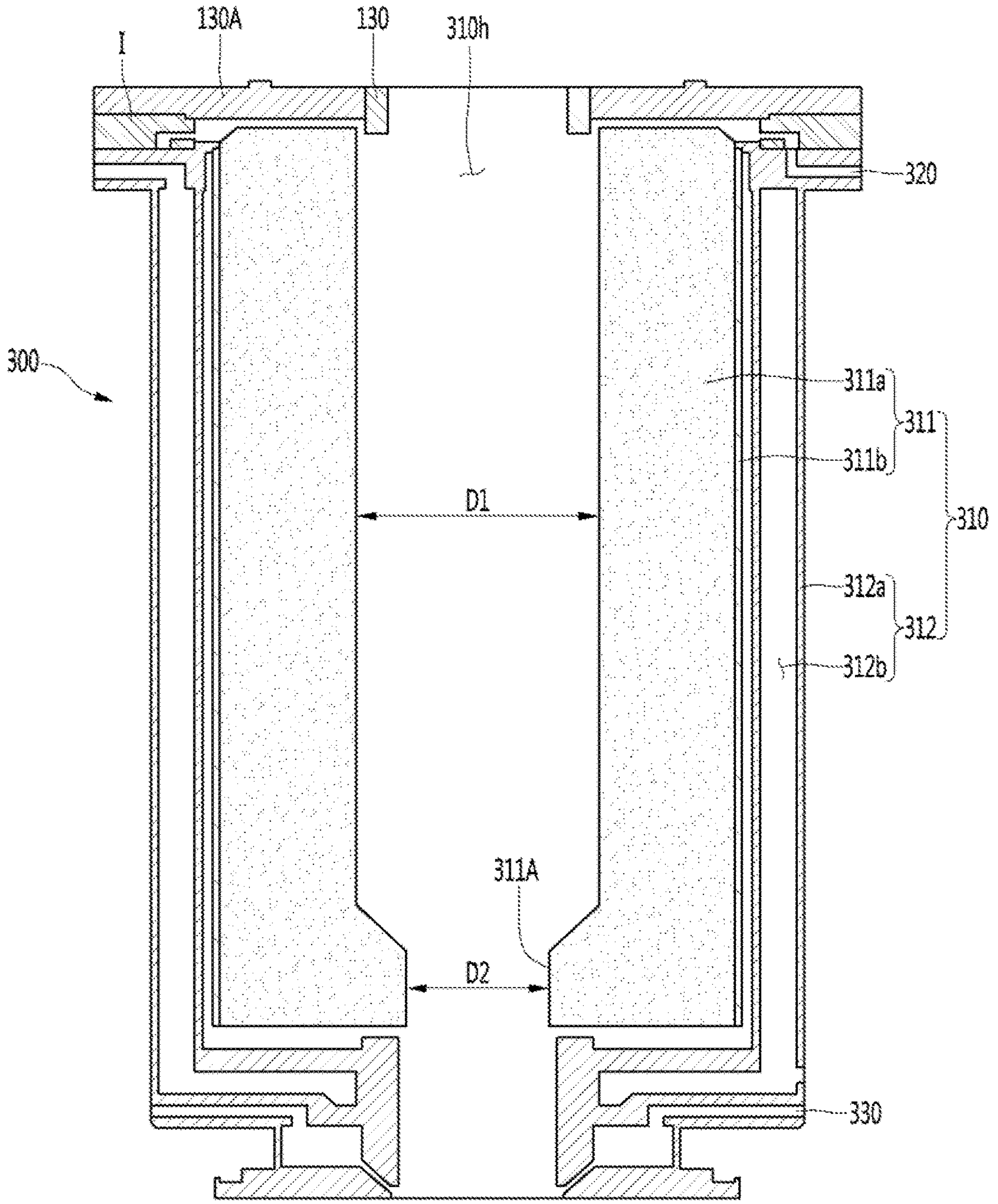

【Figure 9a】
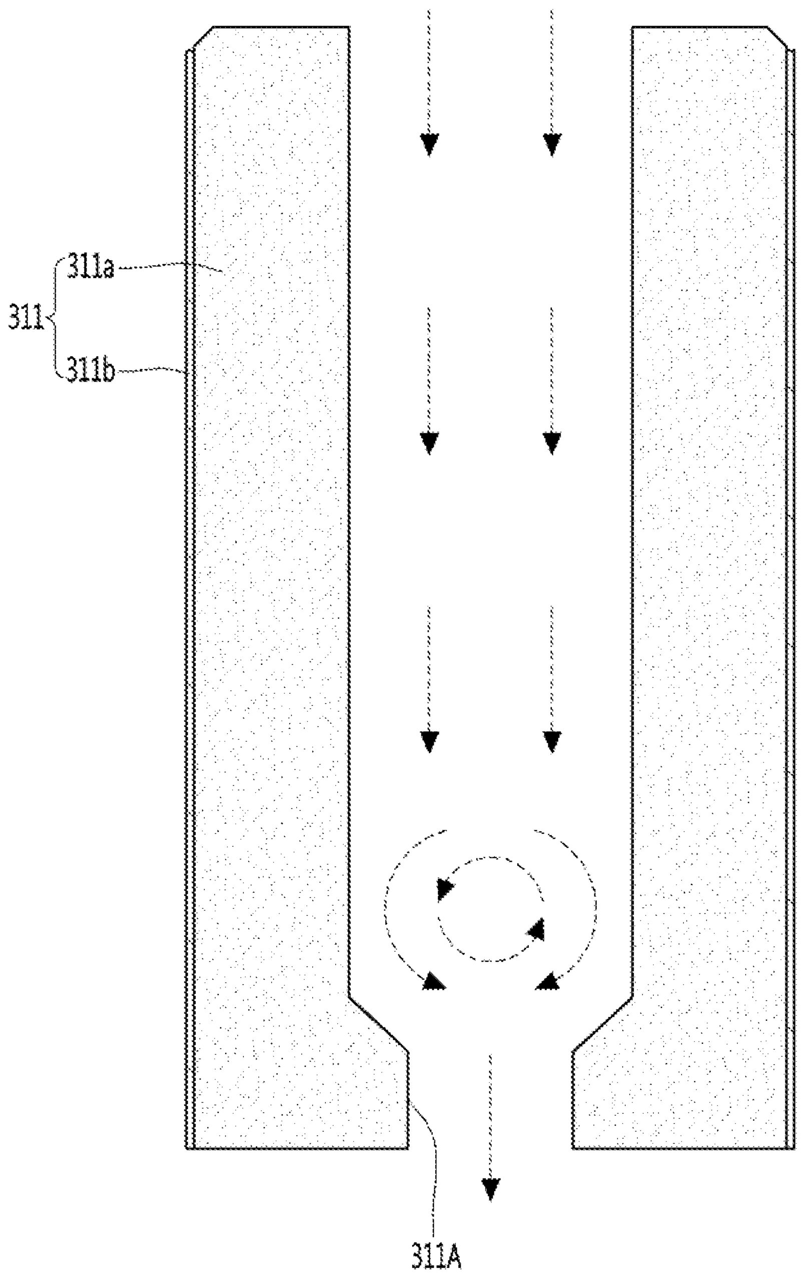

【Figure 9b】
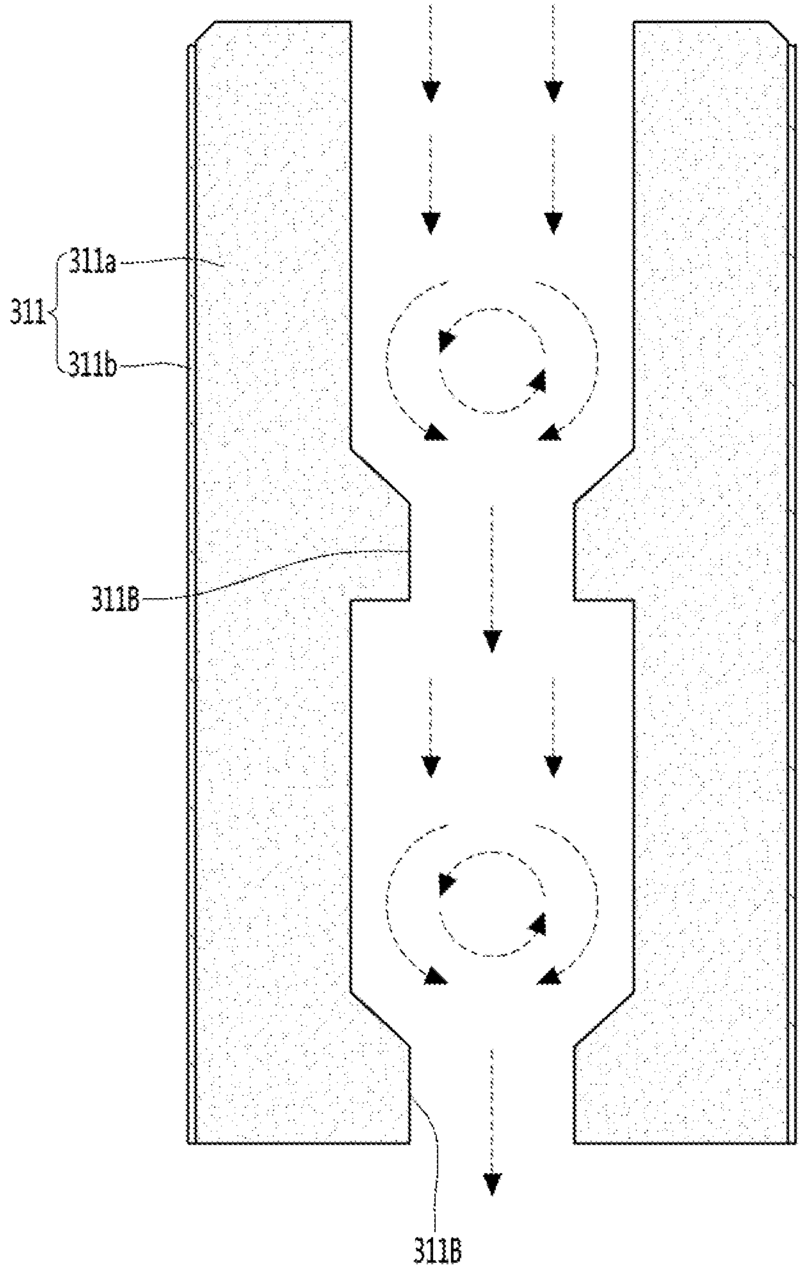

【Figure 9c】
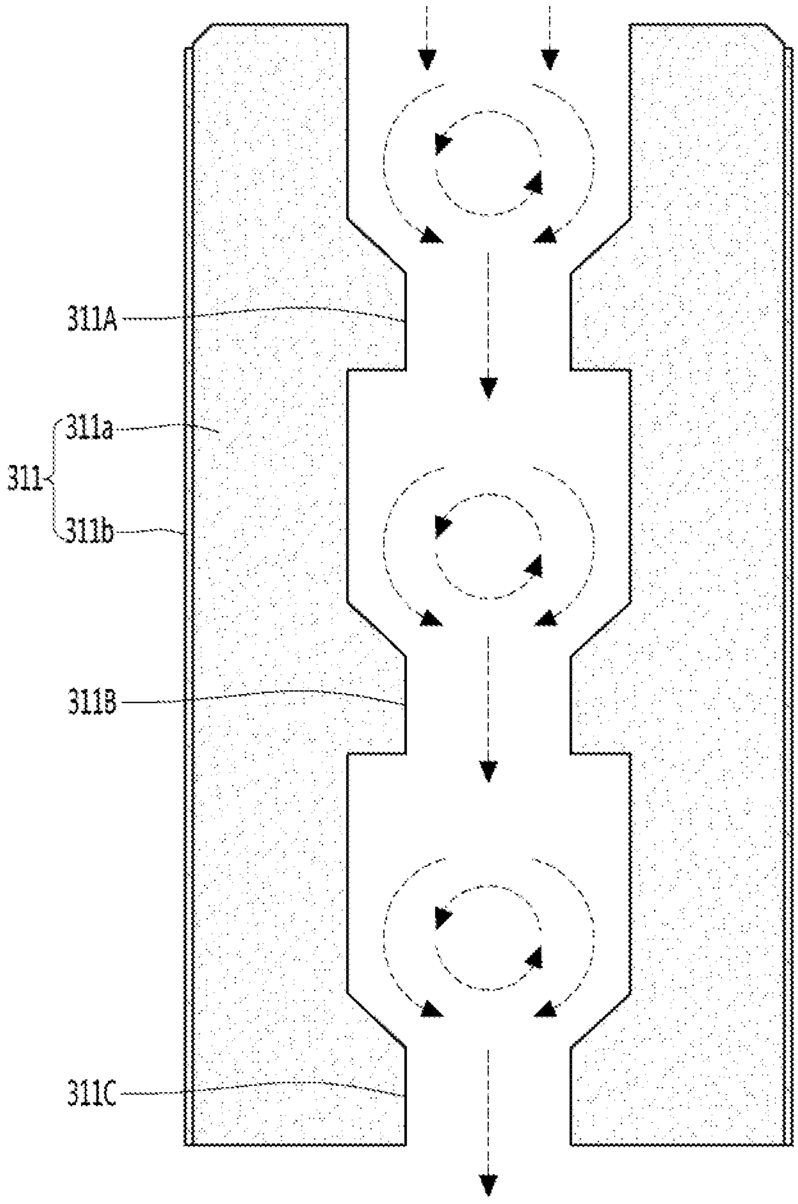

【Figure 10a】
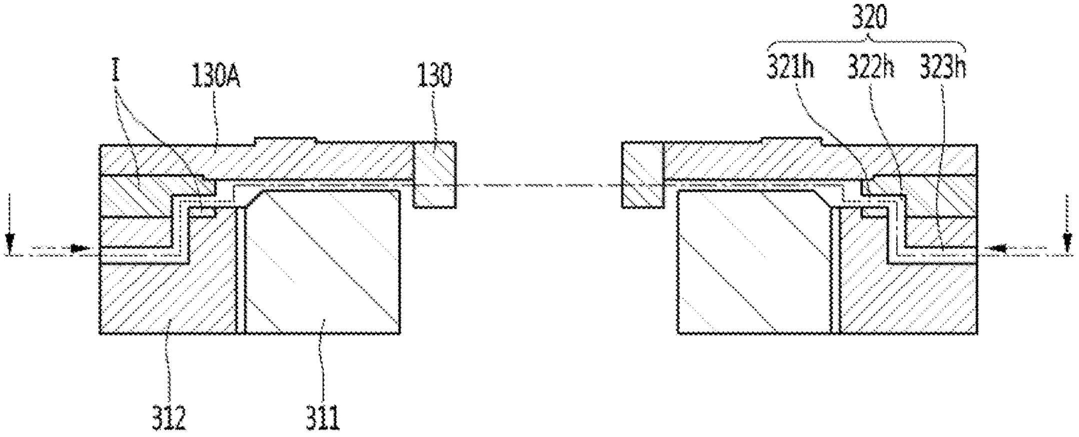
【Figure 10b】
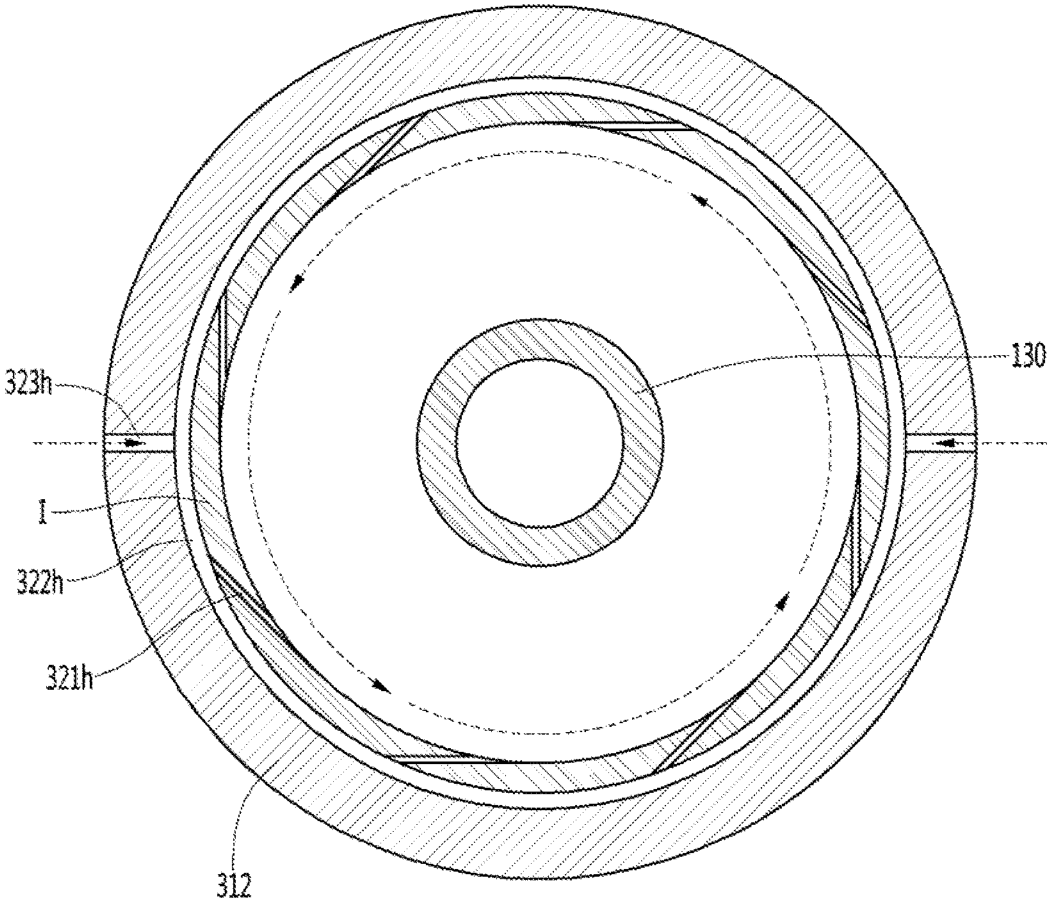

【Figure 11a】
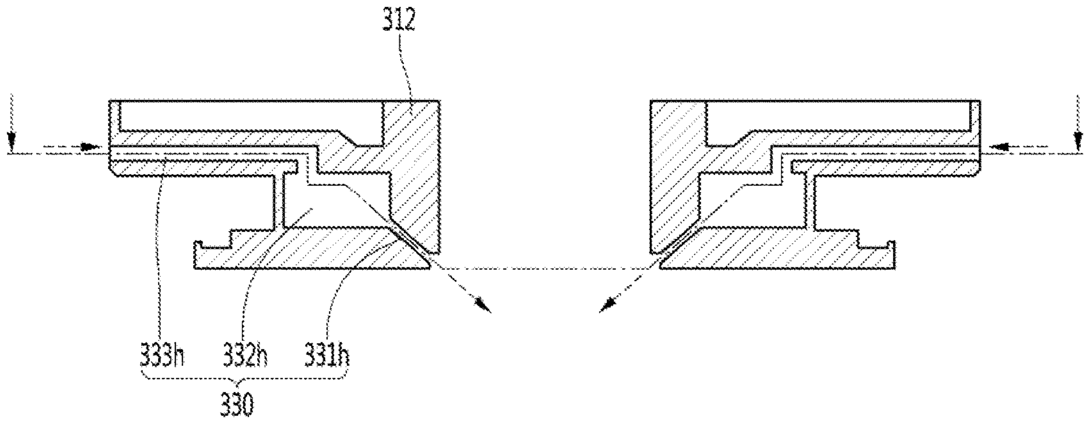
【Figure 11b】
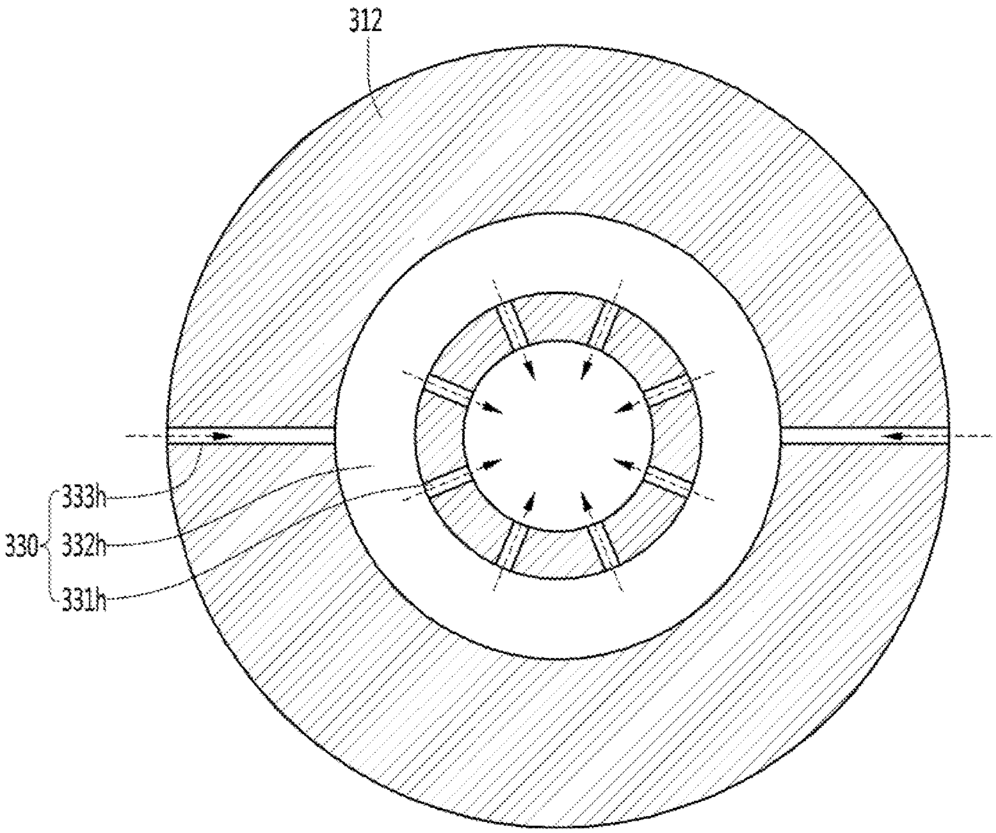

【Figure 12】
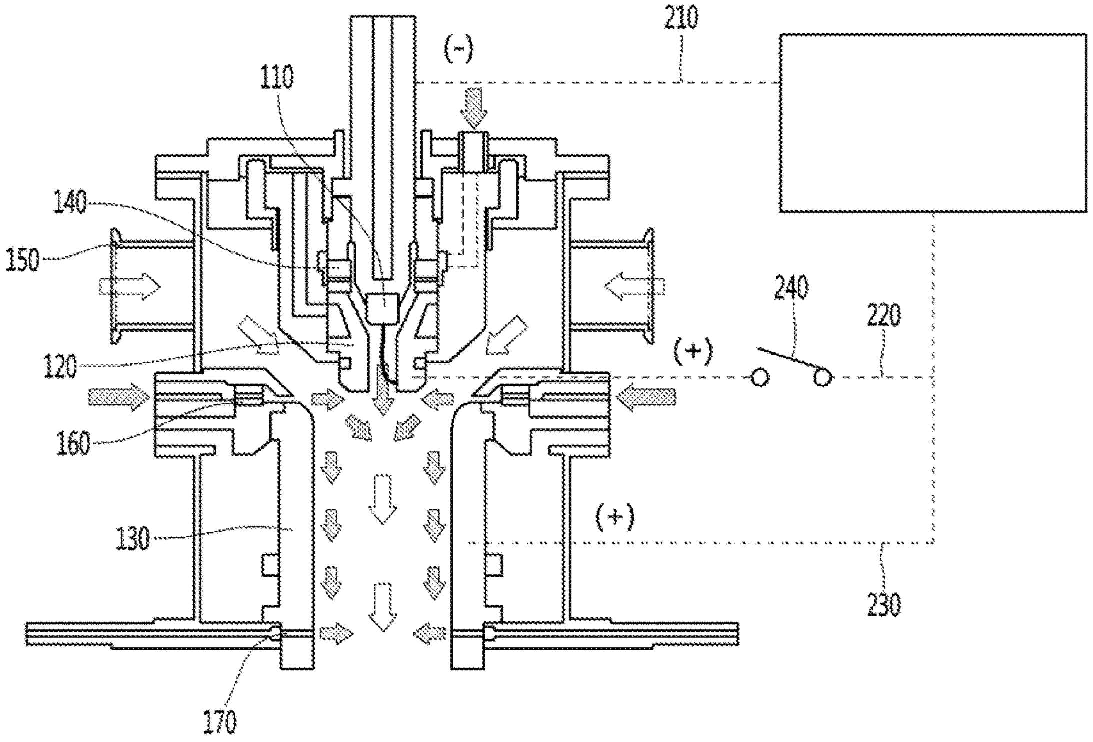

【Figure 13】
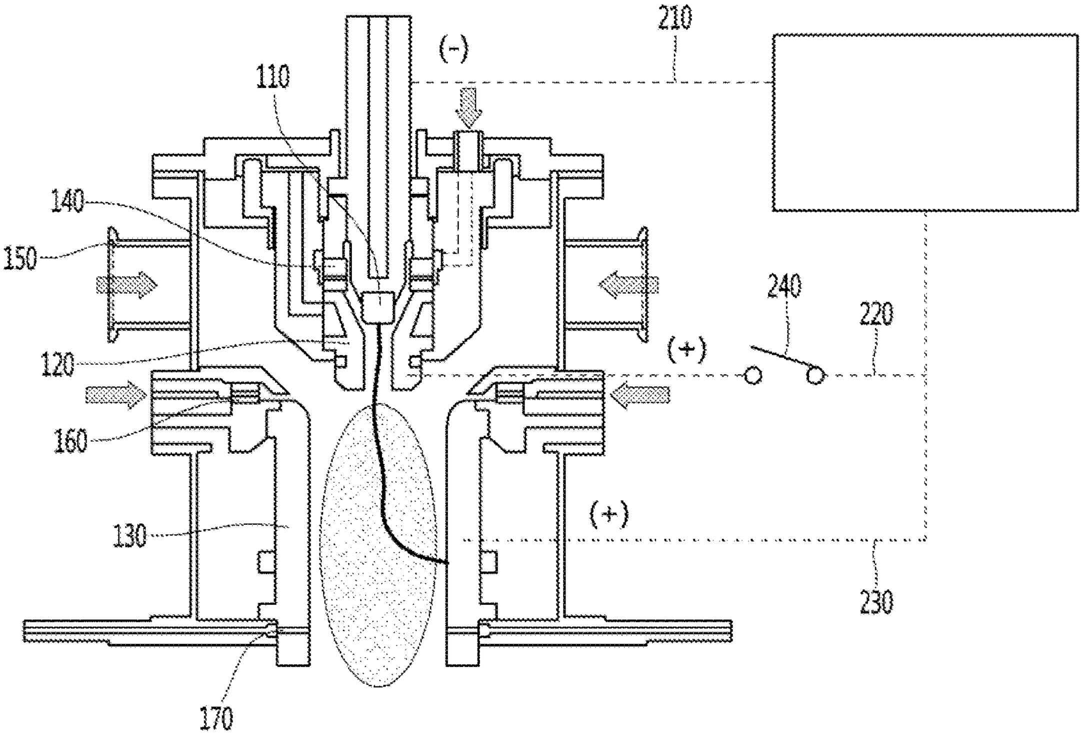

【Figure 14】
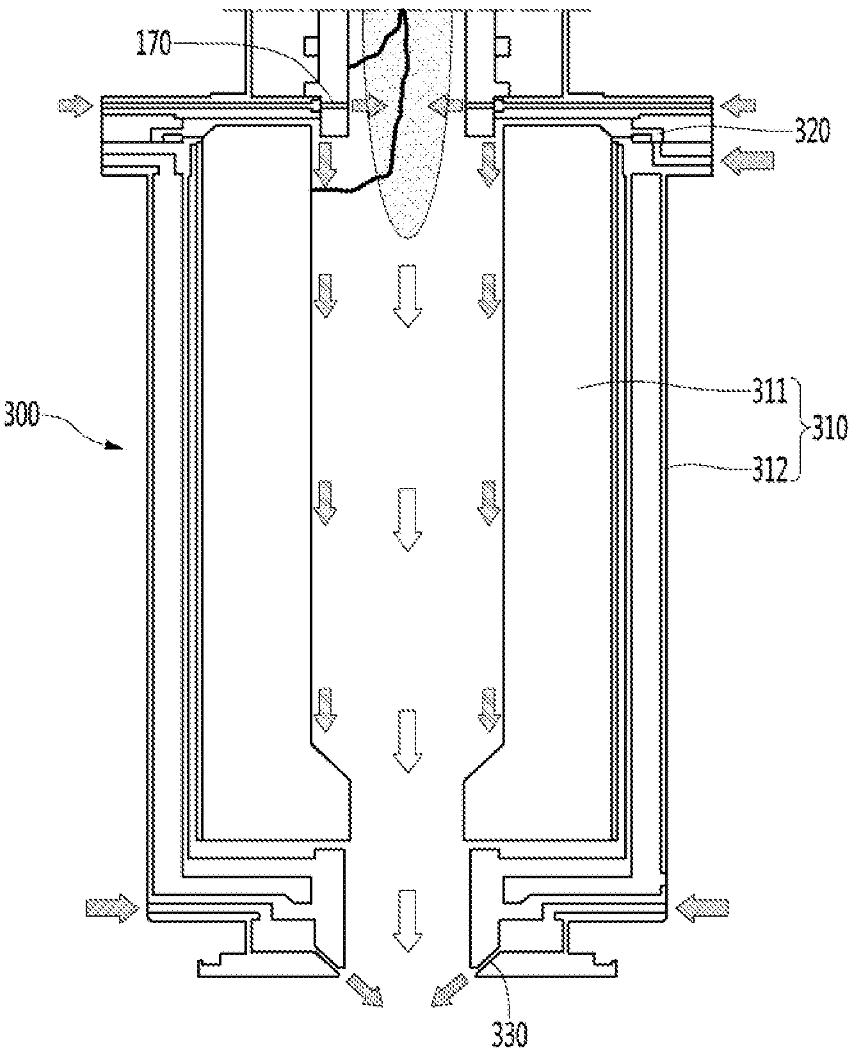

THERMAL PLASMA PROCESSING APPARATUS

CROSS-REFERENCE TO RELATED APPLICATIONS

This application is the National Stage filing under 35 U.S.C. 371 of International Application No. PCT/KR2020/000924, filed on Jan. 20, 2020, which claims the benefit of earlier filing date and right of priority to Korean Patent Application No. 10-2019-0007398, filed on Jan. 21, 2019, the contents of which are all incorporated by reference herein in their entirety.

TECHNICAL FIELD

The present disclosure relates to a thermal plasma processing apparatus capable of efficiently using thermal plasma and securing a reaction time for the thermal decomposition of the processing gas.

BACKGROUND ART

In general, thermal plasma is a partially ionized gas mainly composed of electrons, ions, and neutral particles (atoms and molecules) generated by arc discharge, and maintains a local thermodynamic equilibrium state and thus all of the constituent particles form a high-speed jet flame with the same temperature ranging from thousands to tens of thousands of degrees.

As described above, by using the characteristics of thermal plasma with high temperature, high heat capacity, high speed, and a large amount of active particles, the thermal plasma is being used in advanced technologies in various industrial fields.

Recently, as environmental pollution of specific industrial waste has emerged as a social problem, interest in treatment technology using thermal plasma for the purpose of removing harmful gases and greenhouse gases emitted from electronic industries such as semiconductors/displays is increasing.

Thermal plasma processing apparatus (plasma torch, plasmatron) using electrical energy is an apparatus that converts into a large amount of thermal energy that can be used for the decomposition of an object to be treated or the like.

By generating high-temperature thermal plasma, when sufficient energy for gas ionization is supplied to the two electrodes, an electric arc is generated at the two electrodes, and when the discharge gas passes between the high-temperature arcs, a thermal plasma jet is generated while the discharge gas transitions to a plasma state.

In Korean Patent No. 967016 (application date: Sep. 20, 2007), a plasma torch apparatus is disclosed, which includes, and configured to assemble, an apparatus body part, an electrode part including a cathode provided therein and an anode provided on a front thereof; a body-integrated gas passage provided to supply gas to the side of the electrode part and a body-integrated cooling water passage provided to cool the apparatus, which are provided integrally with the apparatus body part, respectively, and at least one of a gas twisting means and a magnet means respectively disposed around the electrode part, wherein the apparatus body part includes a first metal body part including a first body forming an apparatus outer edge, a housing assembled in the first body and applies electricity while supporting the anode, and a first casing for fixing the anode while being assembled to one side of the first body; a heat insulation body part including a first heat insulation body assembled inside the first body and the housing over the first body and the housing and a second heat insulation body composed of a second casing fixedly assembled to one side of the first body and the first heat insulation body; and a second metal body part including a second body assembled inside the first and second insulating bodies over the first and second insulating bodies and assembled and fixed to apply electricity to the cathode, and an electricity applying piece assembled with the second body and fastened to the inside of the cathode.

As described above, when the electrode part forms an arc, the gas twisting means rotates and injects the discharge gas to move the arc point to prevent abrasion of the electrode part, and the magnet means forms a magnetic field to adjust the electron flow to improve thermal plasma discharge stability.

However, according to the above prior art, a separate structure for supplying the processing gas into the high-temperature thermal plasma jet is not applied, and the length of the arc is limited as the electrode part is composed of the negative electrode and the positive electrode is applied.

Therefore, even if a structure for supplying the processing gas is applied, the processing gas passes through the surface of the thermal plasma jet having a relatively low temperature, so there is a limitation in increasing the thermal decomposition effect of the processing gas, and there is a problem that the required power consumption is increased.

In Korea Patent No. 1573844 (application date: Nov. 11, 2013), a plasma torch is disclosed which includes an electrode protruding in one direction and to which a voltage is applied, a first housing which receives the electrode with a heat insulation member interposed therebetween, which forms a first passage for supplying a discharge gas between the electrode and the first housing, and which discharges the arc generated by being firstly grounded to a first discharge port, and a second housing which forms a second passage supplying a processing gas by receiving a tip of the first housing, and which discharges an arc flame combusting a material to be processed contained in the processing gas to a second discharge port by being secondarily grounded and thus extending the arc.

As described above, since the arc is formed in the first housing and the second housing, the length of the arc can be extended, and the arc can be rotated through a screw line formed inside the second housing, and the processing gas is supplied and passed through the center part of the high-temperature thermal plasma jet to effectively process the processing gas.

However, according to the prior art, there is a limit in lengthening the arc length. In addition, since the processing gas is immediately discharged into the atmosphere after passing through the high-temperature arc, it is difficult to secure a reaction time for the processing gas to be sufficiently thermally decomposed in an insulated space.

In addition, according to the prior art, the rotation of the arc is induced by using the thread of the inner circumferential surface of the housing, but since the arc does not rotate smoothly, the inner circumferential surface of the housing is locally damaged by the arc, making it difficult to secure electrode life.

DISCLOSURE

Technical Problem

The present disclosure has been devised to solve the problems of the prior art, and an object of the present disclosure is to provide a thermal plasma processing apparatus capable of securing a thermal decomposition reaction time of a processing gas.

In addition, an object of the present disclosure is to provide a thermal plasma processing apparatus capable of uniformly rotating the arc and appropriately adjusting the length of the arc.

Technical Solution

A thermal plasma processing apparatus according to an embodiment of the present disclosure includes a torch part in which an arc is generated between a negative electrode and a positive electrode, and in which a processing gas to be thermally decomposed by the arc is injected between the negative electrode and the positive electrode, a power supply part configured to be connected to the negative electrode and the positive electrode and to apply a high voltage between the negative electrode and the positive electrode, and a reaction part configured to communicate with the torch part and generate turbulence in the processing gas passed through the torch part.

The torch part may include a negative electrode located in a center thereof, a first positive electrode of a cylinder type configured to surround the negative electrode and have a first hole in the center thereof, and a second positive electrode of a cylinder type configured to be spaced apart from the lower side of the first positive electrode and have a second hole communicating with the first hole in the center thereof.

The torch part may include a shaft-type negative electrode housing in which the negative electrode is mounted at the lowermost end and in which a cooling flow path is provided at the center thereof, a first positive electrode housing of a cylindrical type configured to be installed to surround the first positive electrode and to have a supply path communicating with a cooling flow path provided on an outer circumferential surface of the first positive electrode, and a second positive electrode housing of a cylindrical type configured to be installed to surround the second positive electrode and to have a cooling flow path between the second positive electrode and the second positive electrode housing.

The torch part may further include a first discharge gas injection part configured to be provided above the first positive electrode, to inject discharge gas to the inside thereof in a rotational direction, and to supply the discharge gas to the upper portion of the first hole, a processing gas injection part configured to be provided to surround the first positive electrode housing, to inject a processing gas to be processed to the inside thereof in a rotational direction, and to supply the processing gas to an upper part of the second hole, and a second discharge gas injection part configured to be provided between the processing gas injection part and the second positive electrode, to inject the discharge gas into the inside thereof in a rotational direction, and to supply the discharge gas to the upper part of the second hole, and the first and second discharge gas injection parts and the processing gas injection part may be configured to inject discharge gas and processing gas in the same rotational direction.

The first discharge gas injection part may include a first main body part configured to have a cylindrical shape communicating with the first hole and to have a predetermined thickness in a radial direction, and a plurality of first discharge gas injection ports configured to pass through the inner/outer circumferential surface of the first main body part and to inject the discharge gas in a tangential direction with respect to the inner circumferential surface of the first main body part.

The processing gas injection part may include a cylindrical main body part configured to surround the first positive electrode and the first discharge gas injection part and to communicate with the second hole, and a plurality of injection pipes configured to communicate with the inside of the main body part and to inject the processing gas in a tangential direction with respect to the inner circumferential surface of the main body part.

The second discharge gas injection part may include a second main body part configured to have a cylindrical shape communicating with the second hole and to have a predetermined thickness in a radial direction, a plurality of second discharge gas injection ports configured to pass through the inner/outer circumferential surface of the second main body part and to inject the discharge gas in a tangential direction with respect to the inner circumferential surface of the second body part, and a ring-shaped second discharge gas auxiliary injection port configured to communicate with each other outside the second discharge gas injection port.

The torch part may further include a third discharge gas injection part configured to be provided at the second positive electrode and a lower end of the second positive electrode housing, to inject the discharge gas to the inner side in a rotational direction, and to supply the discharge gas to the lower part of the second hole.

The third discharge gas injection part may include a plurality of third discharge gas injection ports configured to pass through the inner circumferential surface of the second positive electrode and the outer circumferential surface of the second positive electrode housing and to inject discharge gas in a tangential direction with respect to the inner circumferential surface of the second positive electrode, and a ring-shaped third discharge gas auxiliary injection port configured to communicate with each other outside the third discharge gas injection port.

The torch part may further include a first magnet part configured to be provided around the first positive electrode and to generate a magnetic field in the same direction as the rotational direction of the discharge gas injected by the first discharge gas injection part.

The torch part may further include a second magnet configured to be provided around the second positive electrode and to generate a magnetic field in the same direction as the rotational direction of the discharge gas injected by the second discharge gas injection part.

The power supply part may include a negative electrode electric wire configured to connect a negative charge to the negative electrode, a first positive electrode electric wire configured to connect a positive charge to the first positive electrode, a second positive electrode electric wire configured to connect a positive charge to the second positive electrode, and a switch configured to be provided on the first positive electrode electric wire and to selectively energize the negative electrode and the first positive electrode.

The reaction part may include a reaction chamber provided under the second positive electrode and provided with a discharge flow path which is long in the axial direction communicating with the second hole, a first protective gas injection part configured to be provided on the upper part of the reaction chamber, to inject the protective gas into the inside thereof, and to supply the protective gas to an upper part of the discharge passage, and a second protective gas injection part configured to be provided under the reaction chamber, to inject a protective gas into the inside thereof, and to remove foreign matters accumulated in the lower part of the discharge flow path.

The reaction chamber may include a cylinder-type inner housing provided with at least one bottleneck formed by decreasing the diameter of the discharge flow path, and a double pipe-type outer housing installed to surround the inner housing and provided with a cooling flow path therein.

The inner housing may be composed of insulation ceramic.

The first and second protective gas injection parts may supply one of nitrogen ($N_2$), argon (Ar), air, and oxygen ($O_2$) as protective gas.

The first protective gas injection part may include a plurality of first protective gas injection ports configured to pass through the upper inner/outer circumferential surface of the reaction chamber and to inject the protective gas in a tangential direction with respect to the inner circumferential surface of the reaction chamber, and a ring-shaped first protective gas auxiliary injection part communicating with each other outside the first protective gas injection ports.

The second protective gas injection part may include a plurality of second protective gas injection ports configured to pass through the lower inner/outer circumferential surface of the reaction chamber and to inject the protective gas in an orthogonal direction with respect to the inner circumferential surface of the reaction chamber, and a ring-shaped second protective gas auxiliary injection port configured to communicate with each other outside the second protective gas injection port.

The second protective gas injection port may be provided to be inclined downward from the outer circumferential surface of the reaction chamber toward the inner circumferential surface in the discharge direction of the discharge flow path.

Advantageous Effect

The thermal plasma processing apparatus according to the present disclosure is provided with a reaction part under the torch part.

Therefore, after the processing gas is thermally decomposed by a high-temperature arc in the torch part, the reaction time can be increased by inducing a turbulent flow of the processing gas in the reaction part, thermal decomposition can be promoted, and processing efficiency and energy efficiency can be improved.

In addition, the torch part is provided with a first discharge gas injection part above the first positive electrode, a processing gas injection part is provided above the second positive electrode to surround the first positive electrode, and a second discharge gas injection part is provided above the second positive electrode.

Accordingly, the discharge gas injected by the first and second discharge gas injection parts forms to smoothly rotate the arc formed inside the first and second positive electrodes, thereby increasing the service life of peripheral components.

Then, the discharge gas injected by the first and second discharge gas injection parts moves or extends the first arc to the second arc inside the second positive electrode to increase the length of the arc, so that the processing gas comes into contact with the center of the high-temperature arc and thus, it is possible to increase the thermal decomposition performance and reduce the power consumption required to decompose the processing gas.

In addition, the torch part is provided with a third discharge gas injection part under the second positive electrode.

Accordingly, by controlling the position of the second arc point by the discharge gas injected by the third discharge gas injection part, the length of the entire arc can be appropriately adjusted, and the arc can be prevented from being exposed to the outside.

Further, the power supply part is connected to the negative electrode, the first positive electrode, and the second positive electrode, and a switch is provided on the electric wire connected to the first positive electrode.

Therefore, by turning on the switch at the initial start-up and then turning off the switch, the first arc is easily generated between the negative electrode and the first positive electrode installed close to each other in the beginning, and then the generation of a second arc can be stably induced to a gap between the negative electrode and the second positive electrode, which are installed to be relatively wide, using the first arc and plasma discharge stability can be improved.

DESCRIPTION OF DRAWINGS

FIG. 1 is a front cross-sectional view illustrating a thermal plasma processing apparatus according to an embodiment of the present disclosure.

FIG. 2 is a front cross-sectional view illustrating an example of the torch part and the power supply part applied to the thermal plasma processing apparatus of the present disclosure.

FIGS. 3*a* and 3*b* are a front cross-sectional view and a plan cross-sectional view illustrating an example of the first discharge gas injection part applied to FIG. 2.

FIGS. 4*a* and 4*b* are a front cross-sectional view and a plan cross-sectional view illustrating an example of the processing gas injection part applied to FIG. 2.

FIGS. 5*a* and 5*b* are a front cross-sectional view and a plan cross-sectional view illustrating an example of the second discharge gas injection part applied to FIG. 2.

FIGS. 6*a* and 6*b* are a front cross-sectional view and a plan cross-sectional view illustrating an example of a third discharge gas injection part applied to FIG. 2.

FIGS. 7*a* and 7*b* are plan sectional views illustrating first and second embodiments of the magnet part applied to FIG. 2.

FIG. 8 is a front cross-sectional view illustrating an example of the reaction part applied to the thermal plasma processing apparatus of the present disclosure.

FIGS. 9*a* to 9*c* are front cross-sectional views illustrating various examples of the inner housing applied to FIG. 8.

FIGS. 10*a* and 10*b* are a front cross-sectional view and a plan cross-sectional view illustrating an example of the first protective gas injection part applied to FIG. 8.

FIGS. 11*a* and 11*b* are a front cross-sectional view and a plan cross-sectional view illustrating an example of a second protective gas injection part applied to FIG. 8.

FIGS. 12 to 14 are front cross-sectional views illustrating the operating state of the thermal plasma processing apparatus according to an embodiment of the present disclosure.

BEST MODE

Hereinafter, the present embodiment will be described in detail with reference to the accompanying drawings. However, it will be said that the scope of the spirit of the present disclosure provided by the present embodiment can be determined from the matters disclosed in this embodiment, and the spirit of the present disclosure provided by the present embodiment includes the implementation modification such as addition, deletion, and change of components with respect to the proposed embodiment.

FIG. 1 is a front cross-sectional view illustrating a thermal plasma processing apparatus according to an embodiment of the present disclosure.

A thermal plasma processing apparatus according to an embodiment of the present disclosure includes a torch part 100 for thermally decomposing a processing gas by an arc, a power supply part 200 for applying a high voltage to electrodes on a side of the torch part 100, and a reaction part 300 for promoting thermal decomposition of the processing gas that has passed through the torch part 100.

The torch part 100 and the reaction part 300 communicate with each other, and the processing gas may be supplied into the torch part 100 and then discharged through the reaction part 300. Of course, the torch part 100 and the reaction part 300 are configured as one system, but the reaction part 300 may be configured to be detachably attached to the torch part 100.

FIG. 2 is a front cross-sectional view illustrating an example of the torch part and the power supply part applied to the thermal plasma processing apparatus of the present disclosure.

The torch part 100 includes a negative electrode 110, a first positive electrode 120, a second positive electrode 130, a first discharge gas injection part 140, a processing gas injection part 150, a second discharge gas injection part 160, a third discharge gas injection part 170, and first and second magnet parts M1 and M2.

The negative electrode 110 may be formed of a rod-type located in the center and may be made of a tungsten (W) material containing thorium (Th) to which a high voltage can be applied but is not limited thereto.

The negative electrode 110 having such a configuration is mounted on the lower end of the axial negative electrode housing 110A, and a negative electrode cooling flow path 110B through which cooling water can circulate along the axial direction of the negative electrode housing 110A may be provided.

The first positive electrode 120 may be formed of a cylinder type in which the first hole 120*h* surrounding the negative electrode 110 is located in the center and may be made of copper (Cu) or tungsten (W) material capable of generating an arc when a high voltage is applied but is not limited thereto.

In detail, the first positive electrode 120 may include a negative electrode receiving part 121 surrounding the circumference of the negative electrode 110, and a first arc generating part 122 that is continuous below the negative electrode receiving part 121 and electrically generates the first arc.

In addition, the diameter of the first hole 120*h* gradually decreases toward the lower side of the negative electrode receiving part 121 and may be uniformly configured in the first arc generating part 122. In addition, it may be configured to maintain a minimum gap between the negative electrode 110 and the negative electrode receiving part 121 to facilitate arc generation between the negative electrode 110 and the first positive electrode 120.

Accordingly, when the discharge gas passes through the first hole 120*h* of the first positive electrode 120, the speed of the discharge gas increases as the discharge gas passes between the negative electrode receiving part 121 and the first arc generating part 122 and is pressurized. In addition, the accelerated discharge gas may move the first arc generated inside the first positive electrode 120 to the inside of the second positive electrode 130, and the arc moved to the second positive electrode 130 or the arc generated in the second positive electrode 130 is called as a second arc.

The first positive electrode 120 having such a configuration is mounted on the inner circumferential surface of the first positive electrode housing 120A having a cylindrical shape, a first positive electrode cooling flow path 120B through which cooling water may circulate may be provided in the first positive electrode housing 120A, and a cooling groove 123 communicating with the first positive electrode cooling flow path 120B may be formed along the outer circumferential surface of the first positive electrode 120 in order to increase cooling efficiency.

The second positive electrode 130 may be spaced apart from the lower side of the first positive electrode 120, may be configured to be of a cylinder type in which a second hole 130*h* capable of communicating with the first hole 120*h* is located in the center, may be configured to be larger than the first positive electrode 120, and, like the first positive electrode 120, may be made of a material capable of applying a high voltage.

In detail, the diameter of the second hole 130*h* is configured to be larger than the diameter of the first hole 120*h*, the second arc formed inside the second hole 130*h* is induced not to be transferred to the first hole 120*h*, and the first arc formed inside the first hole 120*h* can be stably moved or extended to the inside of the second hole 130*h*.

In addition, the length of the second hole 130*h* is configured to be longer than the length of the first hole 120*h*, and the second arc formed inside the second hole 130*h* may be configured to thermally decompose the processing gas.

The second positive electrode 130 having the above configuration is mounted on the inner circumferential surface of the second positive electrode housing 130A having a cylindrical shape and a second positive electrode cooling flow path 130B through which cooling water may circulate may be provided inside the second positive electrode housing 130A.

In addition to the above components, the first discharge gas injection part 140, the processing gas injection part 150, and the second and third discharge gas injection parts 160 and 170 included in the torch part 100 will be described in detail below.

Meanwhile, the negative electrode housing 110A and the first and second positive electrode housings 120A and 130A may be made of a metal material, and when a high voltage is applied to the negative electrode 110 and the first and second positive electrodes 120 and 130 by the power supply part 200, current may also flow in the negative electrode housing 110A and the first and second positive electrode housings 120A, 130A.

Accordingly, the negative electrode housing 110A and the first and second positive electrode housings 120A and 130A should be connected with a heat insulation member I therebetween in order to insulate the negative electrode housing 110A and the first and second positive electrode housings 120A and 130A from other surrounding components.

The power supply part 200 is a device capable of supplying direct current power and is configured to energize the negative electrode 110 and the first positive electrode 120 or to energize the negative electrode 110 and the second positive electrode 120.

In detail, the power supply part 200 may further include a negative electrode electric wire 210 configured to connect a negative charge to the negative electrode 110, a first positive electrode electric wire 220 configured to connect a positive charge to the first positive electrode 120, a second positive electrode electric wire 230 configured to connect the positive charge to the second positive electrode 130, and a switch 240 provided on the first positive electrode electric wire 220.

When the switch 240 is temporarily turned on during initial start-up, a first arc is generated inside the first positive electrode 120 as the negative electrode 110 and the first positive electrode 120 are energized, and the negative electrode and the second positive electrode can also be maintained an energized state.

However, since the gap between the negative electrode 110 and the second positive electrode 130 is somewhat large, a second arc is not easily generated between the negative electrode and the second positive electrode 130, but the second arc can be easily induced by the first arc.

Thereafter, when the switch 240 is turned off, even if the electricity supplied to the first positive electrode 110 is cut off, the negative electrode 110 and the second positive electrode 130 maintain an energized state, and a second arc can be stably generated inside the second positive electrode 130.

FIGS. 3*a* and 3*b* are a front cross-sectional view and a plan cross-sectional view illustrating an example of the first discharge gas injection part applied to FIG. 2.

The first discharge gas injection part 140 supplies a discharge gas for forming plasma inside the first positive electrode 120 and may be configured to be provided above the first positive electrode 120 and supply the discharge gas to the inside of a first hole 120*h* of the first positive electrode in a rotational direction.

The first discharge gas injection part 140 may be made of a heat insulation material, and the discharge gas injected into the first discharge gas injection part 140 may be composed of a gas such as nitrogen ($N_2$), argon (Ar), air, oxygen ($O_2$), and hydrogen (Hz).

In detail, the first discharge gas injection part 140 may include a first main body part 141 having a cylindrical shape, and a plurality of first injection ports 141*h* horizontally passing through the inner/outer circumferential surface of the first main body part 141.

The first main body part 141 may have a cylindrical shape communicating with the upper side of the first hole 120*h* of the first positive electrode and may be configured to have a predetermined width in a radial direction as well as a predetermined thickness in a height direction.

The first injection port 141*h* may be configured to inject the discharge gas to rotate along the inner circumferential surface of the first main body part 141 in a clockwise or counterclockwise direction.

According to the embodiment, the first injection port 141*h* is formed in a tangential direction with respect to the inner circumferential surface of the first main body part 141, and four first injection ports 141*h* may be provided at regular intervals in the circumferential direction but is not limited thereto.

Accordingly, when the discharge gas is supplied in the rotational direction along the inner circumferential surface of the first positive electrode 120 by the first discharge gas injection part 140, the discharge gas may be generated as thermal plasma by the first arc.

In addition, since the first arc moves or extends to the second arc along the flow direction of the discharge gas, the entire length of the arc can be lengthened.

FIGS. 4*a* and 4*b* are a front cross-sectional view and a plan cross-sectional view illustrating an example of the processing gas injection part applied to FIG. 2.

The processing gas injection part 150 is for supplying a processing gas to be thermally decomposed and a reaction gas chemically reacting with the processing gas and is provided on the upper side of the second positive electrode 130 to surround the circumference of the first anode 120, and the processing gas and the reaction gas may be configured to supply the inside of the second hole 130*h* of the second positive electrode in a rotational direction.

The processing gas is a greenhouse gas and harmful gas and may be $N_2$ gas in which PFCs gas ($CF_4$, $SF_6$, $C_2F_6$, $NF_3$, or the like) is mixed, and the reaction gas may be air, steam ($H_2O$), oxygen ($O_2$), hydrogen ($H_2$), or the like that can decompose the processing gas through a chemical reaction with the processing gas described above, but is not limited thereto.

In detail, the processing gas injection part 150 may include a cylindrical main body part 151 and a plurality of injection pipes 152 horizontally provided outside the main body part 151 so as to communicate with the inside of the main body part 151.

The main body part 151 has a large cylindrical shape surrounding the first positive electrode 120 and the first discharge gas injection part 140 and may communicate with an upper side of the second hole 130*h* of the second positive electrode.

The injection pipe 152 may be configured to inject the processing gas and the reaction gas along the inner circumferential surface of the main body part 151 in a clockwise or counterclockwise direction.

According to the embodiment, the injection pipe 152 is provided in a tangential direction with respect to the inner circumferential surface of the main body part 151, and four injection pipes 152 may be provided at regular intervals in the circumferential direction but is not limited thereto.

In order to smoothly reach the processing gas to the center part of the arc, the rotational direction of the processing gas injected by the injection pipe 151 is preferably configured to coincide with the rotational direction of the discharge gas injected by the first injection port 141*h* described above.

Usually, when the processing gas is supplied from the upper side of the arc, if the arc length is short, the processing gas comes into contact with the surface of the arc having a relatively low temperature.

However, according to the present disclosure, the total length of the arc including the lengths of the first and second arcs can be increased by the discharge gas supplied by the first discharge gas injection part 140 and the second discharge gas injection part 160, and the length of the arc may be increased even by the processing gas supplied by the processing gas injection part 150.

Therefore, when the processing gas is supplied from the upper side of the second positive electrode 130 in the rotational direction by the processing gas injection part 150, the processing gas comes into contact with the center part of the second arc having a relatively high temperature, and the thermal decomposition performance of the processing gas can be improved.

FIGS. 5*a* and 5*b* are a front cross-sectional view and a plan cross-sectional view illustrating an example of the second discharge gas injection part applied to FIG. 2.

The second discharge gas injection part 160 supplies discharge gas for rotational driving of the second arc formed inside the second positive electrode 130, is provided above the second positive electrode 130, and may be configured to supply the discharge gas to the inside of the second hole 130*h* of the second positive electrode 130 in the rotational direction.

Of course, the discharge gas injected into the second discharge gas injection part 160 may be also a gas such as nitrogen ($N_2$), argon (Ar), or a gas such as air, oxygen ($O_2$), hydrogen ($H_2$), but is not limited thereto.

The second discharge gas injection part 160 is configured in the same way as the first discharge gas injection part 140 and may include a second main body part 161 having a cylindrical shape made of a heat insulation material, and a plurality of second injection port 161*h* passing through the inner/outer circumferential surface of the second main body part 161 horizontally.

According to the embodiment, the second injection port 161*h* is formed in a tangential direction with respect to the inner circumferential surface of the second main body part 161, and the eight second injection ports 161*h* may be provided at regular intervals in the circumferential direction but is not limited thereto. However, the second injection port 161*h* is configured to inject the discharge gas in the same rotational direction as the first injection port 141*h*.

In addition, in order to uniformly supply the discharge gas to the plurality of second injection ports 161*h*, a ring-shaped auxiliary injection port 162*h* communicating with each other outside the second injection port 161*h* is provided in the second positive electrode housing 130B or a communication hole 163*h* for injecting a discharge gas into the auxiliary injection port 162*h* from the outside may also be provided in the second positive electrode housing 130B but is not limited thereto.

Therefore, when the discharge gas is supplied along the inner circumferential surface of the second positive electrode 130 in the rotational direction by the second discharge gas injection part 160, the discharge gas induces effective rotational driving by the second arc, and high-temperature thermal plasma causes the processing gas to thermally decompose. Of course, it is possible to prevent the inner circumferential surface of the second positive electrode 130 from being damaged by the second arc from by-products generated during the decomposition of the processing gas due to the influence of the flow direction of the discharge gas.

FIGS. 6*a* and 6*b* are a front cross-sectional view and a plan cross-sectional view illustrating an example of a third discharge gas injection part applied to FIG. 2.

The third discharge gas injection part 170 is for forming a flow of discharge gas capable of restraining the length of the arc, is provided below the second positive electrode 130, and is configured to supply the discharge gas into the lower side of the second hole 130*h* of the second positive electrode.

The discharge gas injected into the third discharge gas injection part 170 may also be composed of a gas such as nitrogen ($N_2$) and argon (Ar), or a gas such as air, oxygen ($O_2$), and hydrogen ($H_2$), but not limited thereto.

In detail, the third discharge gas injection part 170 may be configured as a third injection port 171*h* horizontally passing through the lower inner/outer circumferential surface of the second positive electrode 130.

According to the embodiment, the third injection port 171*h* is formed in a tangential direction with respect to the inner circumferential surface of the second positive electrode 130, and the eight third injection ports 171*h* may be provided at regular intervals in the circumferential direction but is not limited thereto. However, the third injection port 171*h* is also configured to inject the discharge gas in the same rotational direction as the first and second injection ports 141*h* and 161*h*.

In addition, a ring-shaped auxiliary injection port 172*h* communicating with each other on the outside of the third injection port 171*h* and a communication hole 173*h* for injecting a discharge gas into the auxiliary injection port 162*h* from the outside are additionally provided with a second positive electrode housing 130A but is not limited thereto.

Accordingly, when the discharge gas is supplied to the lower side of the second positive electrode 130 in the rotational direction by the third discharge gas injection part 170, it is possible to prevent the length of the second arc formed in the vertical direction from being further extended.

FIGS. 7*a* and 7*b* are plan sectional views illustrating first and second embodiments of the magnet part applied to FIG. 2.

The magnet parts M1 and M2 form a magnetic field around the arc to help the arc rotate and may include the first magnet part M1 mounted on the outer circumferential surface of the first positive electrode 120 and a second magnet part M2 mounted on the outer circumferential surface of the second positive electrode 130.

The magnet parts M1 and M2 are composed of a cylindrical permanent magnet surrounding the electrodes 120 and 130, and the N pole part N and the S pole part N can be configured to be overlapped so that the inner circumferential part and the outer circumferential part have different polarities from each other.

Of course, the shapes of the magnet parts M1 and M2 may also be configured differently according to the shapes of the electrodes 120 and 130.

When the processing gas is injected in a counterclockwise direction, as illustrated in FIG. 7*a*, the S pole part S is mounted to surround the electrode, and the N pole part N is mounted to surround the S pole part S so that a magnetic field can be formed in the counterclockwise direction which is a flowing direction of the processing gas.

When the processing gas is injected in the clockwise direction, as illustrated in FIG. 7*b*, the N pole part N is mounted to surround the electrode, and the S pole part S is mounted to surround the N pole part N so that a magnetic field can be formed in a clockwise direction which is a flowing direction of the processing gas.

Therefore, by improving the rotation of the thermal plasma arc formed inside the electrodes 120 and 130 under the influence of the magnetic field formed by the magnet parts M1 and M2, thermal decomposition performance can be increased, and the thermal plasma jet formed by the arc is not eccentric and is located in the center part of the electrodes 120 and 130 so that discharge stability of the thermal plasma jet can be improved.

FIG. 8 is a front cross-sectional view illustrating an example of the reaction part applied to the thermal plasma processing apparatus of the present disclosure.

The reaction part 300 includes a reaction chamber 310, a first protection gas injection part 320, and a second protection gas injection part 330.

The reaction chamber 310 communicates with the second hole 130*h* (illustrated in FIG. 2) of the second positive electrode in which the processing gas is thermally decomposed by the second arc on a side of the torch part 200 (illustrated in FIG. 2) described above, and a discharge flow path 310*h* which is long in the axial direction is provided at the center part.

Accordingly, a reaction time is provided in which thermal decomposition can be promoted while the processing gas that has passed through the torch part 200 (illustrated in FIG. 2) passes through the reaction chamber before being discharged to the outside.

According to the embodiment, the reaction chamber 310 may include an inner housing 311 having at least one bottleneck 311A formed by decreasing the diameter of the discharge flow path 310*h*, and an outer housing 312 provided to surround the inner housing 311 so as to cool the inner housing 311.

The inner housing 311 has a cylindrical shape and includes a heat insulation material 311*a* having a bottleneck 311A on an inner circumferential surface, and a housing 311*b* provided to surround the outside of the heat insulation material 311*a*. In this case, the heat insulation material 311*a* may be made of ceramic that can withstand even a high-temperature environment.

The outer housing 312 is in the form of a double pipe 312*a*, and a cooling flow path 312*b* is provided inside the double pipe 312*a*.

Accordingly, the discharge flow path 310*h* can be maintained at a high temperature by the inner housing 311, and the heat insulation material on a side of the inner housing 311 can be effectively cooled by the outer housing 312.

FIGS. 9*a* to 9*c* are front cross-sectional views illustrating various examples of the inner housing applied to FIG. 8.

A plurality of bottlenecks 311A, 311B, and 311C may be provided in a discharge direction of the processing gas inside the inner housing 311.

The diameter D2 of the bottlenecks 311A, 311B, and 311C may be configured to be smaller than the diameter D1 of the inner housing 311, and the diameter thereof may be gradually reduced in consideration of the flow of the processing gas.

The bottlenecks 311A, 311B, and 311C of this configuration generate turbulence in the flow of the processing gas passing through the reaction chamber 310 (illustrated in FIG. 8), induce mixing of the processing gas, and by delaying the time it takes for the processing gas to exit the reaction chamber 310 (illustrated in FIG. 8), thermal decomposition of the process gas can be promoted.

Of course, as the number of bottlenecks 311A, 311B, and 311C increases, thermal decomposition of the processing gas may be further promoted, but the number of bottlenecks 311A, 311B, and 311C may be appropriately adjusted in consideration of flow resistance.

FIGS. 10*a* and 10*b* are a front cross-sectional view and a plan cross-sectional view illustrating an example of the first protective gas injection part applied to FIG. 8.

The first protective gas injection part 320 is for forming a protective gas region along the inner circumferential surface of the reaction chamber 310 (illustrated in FIG. 8) by injecting a protective gas therein, and is located above the reaction chamber 310 (illustrated in FIG. 8), and may be configured to inject the protective gas inside the reaction chamber 310 (illustrated in FIG. 8) in the rotational direction.

The protective gas injected into the first protective gas injection part 320 may also be composed of a gas such as nitrogen ($N_2$) and argon (Ar), or a gas such as air and oxygen ($O_2$), like the discharge gas, but is not limited thereto.

The first protective gas injection part 320 may include a first protection gas injection port 321*h* horizontally passing through the upper portion of the reaction chamber 310 (illustrated in FIG. 8).

According to the embodiment, a heat insulation member I may be mounted between the torch part 100 (illustrated in FIG. 1) and the reaction chamber 310 (illustrated in FIG. 8), a first discharge gas injection port 312*h* may be provided in the heat insulation member (I), the first protective gas injection port 321*h* may be formed in a tangential direction with respect to the inner circumferential surface of the reaction chamber 310 (illustrated in FIG. 8), and the eight first protective gas injection ports 321*h* may be provided at regular intervals in the circumferential direction but is not limited thereto.

Of course, in consideration of the flow of the discharge gas and the processing gas on a side of the torch part 100 (illustrated in FIG. 1), it is preferable that the protective gas is also injected in the same rotational direction.

In addition, in order to uniformly supply the protective gas to the plurality of first protective gas injection ports 321*h*, a ring-shaped auxiliary injection port 322*h* communicating with each other may be provided outside the first protective gas injection port 321*h*, and a communication hole 323*h* for injecting the protective gas into the auxiliary injection port 322*h* from the outside may be provided but is not limited thereto.

Accordingly, when the protective gas is supplied in the rotational direction along the inner circumferential surface of the reaction chamber 310 (illustrated in FIG. 8) by the first protective gas injection part 320, a protective gas region is formed along the inner circumferential surface of the reaction chamber 310 (illustrated in FIG. 8).

In addition, as the processing gas passes through the reaction chamber 310 (illustrated in FIG. 8), thermal decomposition is promoted to generate corrosive gas, and, by the protective gas region, the corrosive gas can prevent direct contact with the inner circumferential surface of the reaction chamber 310 (illustrated in FIG. 8) and corrosion of the reaction chamber 310 (illustrated in FIG. 8) can be prevented.

FIGS. 11*a* and 11*b* are a front cross-sectional view and a plan cross-sectional view illustrating an example of a second protective gas injection part applied to FIG. 8.

The second protective gas injection part 330 is for discharging foreign matters accumulated on the lower side of the reaction chamber 310 (illustrated in FIG. 8) by injecting a protective gas into the inside thereof, is provided on the lower side of the reaction chamber 310 (illustrated in FIG. 8), and may be configured to inject a protective gas into the reaction chamber 310 (illustrated in FIG. 8) in an orthogonal direction.

The protective gas injected into the second protective gas injection part 330 may also be composed of a gas such as nitrogen ($N_2$) and argon (Ar) or a gas such as air and oxygen ($O_2$), like the discharge gas, but is not limited thereto.

The second discharge gas injection part 330 may include a second protection gas injection port 331*h* that obliquely passes through the lower part of the reaction chamber 310 (illustrated in FIG. 8), and the outlet of the second protection gas injection port 331*h* may be located at the lowermost end of the inner circumferential surface of the reaction chamber 310 (illustrated in FIG. 8).

According to the embodiment, the reaction chamber 310 (illustrated in FIG. 8) is configured in such a way that the outer housing 312 surrounds the lower part of the inner housing 311 (illustrated in FIG. 8), and a second protective gas injection port 331*h* may be provided under the outer housing 312.

In this case, the second protective gas injection port 331*h* is formed in an orthogonal direction with respect to the inner circumferential surface of the reaction chamber 310 (illustrated in FIG. 8), and eight second protective gas injection ports 331*h* may be provided at regular intervals in the circumferential direction but is not limited thereto.

In addition, in order to uniformly supply the protective gas to the plurality of second protective gas injection ports 331*h*, a ring-shaped auxiliary injection port 332*h* communicating with each other may be provided outside the second protective gas injection port 331*h*, and a communication hole 333*h* for injecting the protective gas into the auxiliary injection port 332*h* from the outside may be provided but is not limited thereto.

When the high-temperature processing gas is discharged from the reaction chamber 310 (illustrated in FIG. 1) to the outside of room temperature, a large amount of fine particles or the like may be generated and accumulated in the form of foreign matters in the discharge port on the lower side of the reaction chamber 310 (illustrated in FIG. 1).

Accordingly, when the protective gas is supplied to be inclined downward in an orthogonal direction with respect to the inner circumferential surface of the reaction chamber 310 (illustrated in FIG. 1) by the second protective gas injection part 330, the foreign matters accumulated in the lower part of the reaction chamber 310 (illustrated in FIG. 1) can be discharged to the outside, and it is possible to prevent the discharge port of the reaction chamber 310 (illustrated in FIG. 1) from being clogged.

FIGS. 12 to 14 are front cross-sectional views illustrating the operating state of the thermal plasma processing apparatus according to an embodiment of the present disclosure.

At the time of initial start-up, when the switch 240 is turned on as illustrated in FIG. 12, the negative electrode 110 and the first positive electrode 120 are also energized while the negative electrode 110 and the second positive electrode 130 are energized, a first arc is generated between the negative electrode 110 and the first positive electrode 120 that are close to each other, and the first arc can be moved to the second arc even between the negative electrode 110 and the second positive electrode 130 positioned a little farther away.

As illustrated in FIG. 13, even if the switch is turned off, the second arc may be continuously generated, and as the power supply to the first positive electrode 120 is cut off, it is possible to prevent the second arc from moving to the first arc.

As described above, while the first and second arcs are generated in the torch part and, at the same time, the discharge gas and the processing gas are injected, the processing gas is thermally decomposed.

When the discharge gas is injected into the upper side of the first positive electrode 120 through the first discharge gas injection part 140, the discharge gas is in contact with the first arc to form, rotate, and move downward thermal plasma jet. Accordingly, the flow of the discharge gas formed inside the first positive electrode 120 may extend or move the first arc to the inside of the second positive electrode 130.

When the discharge gas is injected into the upper side of the second positive electrode 130 through the second discharge gas injection part 160, the discharge gas is in contact with the second arc to form, rotate, and move downward thermal plasma jet.

As described above, when the arc and thermal plasma jets are formed to be long in the axial direction and the processing gas is injected into the upper side of the second positive electrode 130 through the processing gas injection part 150, the processing gas is not only in contact with the arc for a long time but also passes through the center part of the arc which is approximately 10000° C., the thermal decomposition performance of the processing gas can be further improved.

When the discharge gas is injected into the lower side of the second positive electrode 130 through the third discharge gas injection part 170, the horizontal flow of the discharge gas blocks the vertical flow of the second arc, and thus it is possible to control the length of the second arc as well as prevent exposure to the reaction chamber 310.

As described above, the processing gas thermally decomposed in the torch part flows into the reaction chamber 310 as illustrated in FIG. 14, and while passing through the reaction chamber 310, the processing gas can secure a reaction time under high temperature to promote thermal decomposition.

In addition, the processing gas collides with the bottleneck 311A inside the reaction chamber 310 to form a turbulent flow, thereby inducing mixing of the processing gas and securing a long reaction time of the processing gas, thereby being capable of promoting thermal decomposition of the processing gas.

Meanwhile, when the processing gas is thermally decomposed in the torch part and the reaction chamber 310, a corrosive gas is generated.

Accordingly, when the protective gas is injected into the upper side of the reaction chamber 310 through the first protective gas injection part 320, the protective gas forms a protective gas region on the inner circumferential surface of the reaction chamber 310, and since the corrosive gas is not in direct contact with the inner circumferential surface of the reaction chamber 310, it is possible to prevent corrosion of the reaction chamber 310.

In addition, when the processing gas is discharged from the inside of the high-temperature reaction chamber 310 to the outside thereof which is the relatively low temperature, a large amount of fine particles or the like may be generated and may be accumulated as foreign matters on the lower side of the inside of the reaction chamber 310.

Therefore, when the protective gas is injected into the lower side of the reaction chamber 310 through the second protective gas injection part 330, the protective gas can effectively discharge foreign matters accumulated in the lower part of the reaction chamber 310 to the outside thereof, and it is possible to prevent clogging of the reaction chamber 310.

INDUSTRIAL APPLICABILITY

The present embodiment can be applied to a thermal plasma processing apparatus for thermal decomposing and processing the processing gases such as harmful gases and greenhouse gases.

The invention claimed is:

1. A thermal plasma processing apparatus comprising:

a torch part in which an arc is generated between a negative electrode and a positive electrode, and in which a processing gas to be thermally decomposed by the arc is injected between the negative electrode and the positive electrode;

a power supply part connecting to the negative electrode and the positive electrode and configured to apply a high voltage between the negative electrode and the positive electrode; and a reaction part communicating with the torch part and generate turbulence in the processing gas passed through the torch part, wherein the torch part includes:

a negative electrode located in a center thereof, a first cylindrical positive electrode surrounding the negative electrode and having a first hole in a center thereof, a second cylindrical positive electrode spaced apart from a lower side of the first cylindrical positive electrode and having a second hole communicating with the first hole in a center thereof, a shaft-type negative electrode housing in which the negative electrode is mounted at a lowermost end and in which a cooling flow path is provided at a center thereof, a first cylindrical positive electrode housing surrounding the first cylindrical positive electrode and having a supply path communicating with a cooling flow path provided on an outer circumferential surface of the first cylindrical positive electrode, and a second cylindrical positive electrode housing surrounding the second cylindrical positive electrode and having a cooling flow path between the second cylindrical positive electrode and the second cylindrical positive electrode housing.

2. The thermal plasma processing apparatus of claim 1, wherein the torch part further includes:

a first discharge gas injection part provided above the first cylindrical positive electrode, the first discharge gas injection part configured to inject discharge gas to the inside thereof in a rotational direction, and to supply the discharge gas to the upper portion of the first hole, a processing gas injection part surrounding the first cylindrical positive electrode housing, the processing gas injection part configured to inject a processing gas to be processed to the inside thereof in a rotational direction and to supply the processing gas to an upper part of the second hole, and a second discharge gas injection part between the processing gas injection part and the second cylindrical positive electrode, the second discharge gas injection part configured to inject the discharge gas into the inside thereof in a rotational direction, and to supply the discharge gas to the upper part of the second hole, and wherein the first and second discharge gas injection parts and the processing gas injection part are configured to inject discharge gas and processing gas in the same rotational direction.

3. The thermal plasma processing apparatus of claim 2, wherein the first discharge gas injection part includes:

a first main body part having a cylindrical shape communicating with the first hole and having a predetermined thickness in a radial direction, and a plurality of first discharge gas injection ports passing through the inner and/or outer circumferential surface of the first main body part and configured to inject the discharge gas in a tangential direction with respect to the inner circumferential surface of the first main body part.

4. The thermal plasma processing apparatus of claim 2, wherein the processing gas injection part includes:

a cylindrical main body part surrounding the first cylindrical positive electrode and the first discharge gas injection part and communicating with the second hole, and a plurality of injection pipes communicating with the inside of the main body part and configured to inject the processing gas in a tangential direction with respect to the inner circumferential surface of the main body part.

5. The thermal plasma processing apparatus of claim 2, wherein the second discharge gas injection part includes:

a second main body part having a cylindrical shape communicating with the second hole and having a predetermined thickness in a radial direction, a plurality of second discharge gas injection ports passing through the inner and/or outer circumferential surface of the second main body part and configured to inject the discharge gas in a tangential direction with respect to the inner circumferential surface of the second body part, and a ring-shaped second discharge gas auxiliary injection port communicating with each other outside the second discharge gas injection port.

6. The thermal plasma processing apparatus of claim 2, wherein the torch part further includes a third discharge gas injection part provided at the second cylindrical positive electrode and a lower end of the second cylindrical positive electrode housing, the third discharge gas injection part configured to inject the discharge gas to the inner side in a rotational direction, and to supply the discharge gas to the lower part of the second hole.

7. The thermal plasma processing apparatus of claim 6, wherein the third discharge gas injection part includes:

a plurality of third discharge gas injection ports passing through the inner circumferential surface of the second cylindrical positive electrode and the outer circumferential surface of the second cylindrical positive electrode housing and configured to inject discharge gas in a tangential direction with respect to the inner circumferential surface of the second cylindrical positive electrode, and a ring-shaped third discharge gas auxiliary injection port communicating with each other outside the third discharge gas injection port.

8. The thermal plasma processing apparatus of claim 2, wherein the torch part further includes a first magnet part provided around the first cylindrical positive electrode and configured to generate a magnetic field in the same direction as the rotational direction of the discharge gas injected by the first discharge gas injection part.

9. The thermal plasma processing apparatus of claim 2, wherein the torch part further includes a second magnet provided around the second cylindrical positive electrode and configured to generate a magnetic field in the same direction as the rotational direction of the discharge gas injected by the second discharge gas injection part.

10. The thermal plasma processing apparatus of claim 1, wherein the power supply part includes:

a negative electrode electric wire connecting a negative charge to the negative electrode, a first positive electrode electric wire connecting a positive charge to the first cylindrical positive electrode, a second positive electrode electric wire connecting a positive charge to the second cylindrical positive electrode, and a switch provided on the first positive electrode electric wire and configured to selectively energize the negative electrode and the first cylindrical positive electrode.

11. The thermal plasma processing apparatus of claim 1, wherein the reaction part includes:

a reaction chamber provided under the second cylindrical positive electrode and having a discharge flow path in the axial direction communicating with the second hole, a first protective gas injection part provided on the upper part of the reaction chamber, the first protective gas injection part configured to inject the protective gas into the inside thereof, and to supply the protective gas to an upper part of the discharge passage, and a second protective gas injection part provided under the reaction chamber, the second protective gas injection part configured to inject a protective gas into the inside thereof, and to remove foreign matters accumulated in the lower part of the discharge flow path.

12. The thermal plasma processing apparatus of claim 11, wherein the reaction chamber includes:

a cylindrical inner housing including at least one bottle-neck formed by decreasing the diameter of the discharge flow path, and a double pipe type outer housing surrounding the inner housing and provided with a cooling flow path therein.

13. The thermal plasma processing apparatus of claim 12, wherein the inner housing is composed of insulation ceramic.

14. The thermal plasma processing apparatus of claim 11, wherein the first and second protective gas injection parts supply one of nitrogen ($N_2$), argon (Ar), air, and oxygen ($O_2$) as protective gas.

15. The thermal plasma processing apparatus of claim 11, wherein the first protective gas injection part includes:

a plurality of first protective gas injection ports passing through the upper inner and/or outer circumferential surface of the reaction chamber and configured to inject the protective gas in a tangential direction with respect to the inner circumferential surface of the reaction chamber, and a ring-shaped first protective gas auxiliary injection part communicating with each other outside the first protective gas injection ports.

16. The thermal plasma processing apparatus of claim 11, wherein the second protective gas injection part includes:

a plurality of second protective gas injection ports passing through the lower inner and/or outer circumferential surface of the reaction chamber and configured to inject the protective gas in an orthogonal direction with respect to the inner circumferential surface of the reaction chamber, and a ring-shaped second protective gas auxiliary injection port communicating with each other outside the second protective gas injection port.

17. The thermal plasma processing apparatus of claim 16, wherein the second protective gas injection port is inclined downward from the outer circumferential surface of the reaction chamber toward the inner circumferential surface in the discharge direction of the discharge flow path.

* * * * *